US012695808B2

(12) United States Patent
Bernardos et al.

(10) Patent No.: US 12,695,808 B2
(45) Date of Patent: Jul. 28, 2026

(54) METHODS, APPARATUSES AND SYSTEMS FOR INTEGRATING CONSTRAINED MULTI-ACCESS EDGE COMPUTING HOST IN MULTI-ACCESS EDGE COMPUTING SYSTEM

(71) Applicant: InterDigital Patent Holdings, Inc., Wilmington, DE (US)

(72) Inventors: Carlos Jesus Bernardos, Alcorcon (ES); Antonio de la Oliva, Madrid (ES); Alain Mourad, Ascot (GB); Debashish Purkayastha, Collegeville, PA (US); Shalini Choudhury, Highland Park, NJ (US); Robert Gazda, Spring City, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 94 days.

(21) Appl. No.: 18/280,037

(22) PCT Filed: Mar. 3, 2022

(86) PCT No.: PCT/US2022/018598
§ 371 (c)(1),
(2) Date: Sep. 1, 2023

(87) PCT Pub. No.: WO2022/187418
PCT Pub. Date: Sep. 9, 2022

(65) Prior Publication Data
US 2025/0063096 A1      Feb. 20, 2025

Related U.S. Application Data

(60) Provisional application No. 63/156,599, filed on Mar. 4, 2021, provisional application No. 63/156,500, filed on Mar. 4, 2021.

(51) Int. Cl.
*H04L 67/51*      (2022.01)
*H04L 67/289*      (2022.01)
(Continued)

(52) U.S. Cl.
CPC ............ *H04L 67/51* (2022.05); *H04L 67/289* (2013.01); *H04L 67/52* (2022.05); *H04L 67/59* (2022.05)

(58) Field of Classification Search
CPC ....... H04L 67/51; H04L 67/289; H04L 67/52; H04L 67/59; H04L 67/10; H04W 4/50; G06F 9/54
See application file for complete search history.

(56) References Cited

U.S. PATENT DOCUMENTS

| | | | |
|---|---|---|---|
| 2018/0183855 A1* | 6/2018 | Sabella | ................. G06F 9/5027 |
| 2020/0275313 A1* | 8/2020 | He | ......................... H04L 47/822 |

(Continued)

OTHER PUBLICATIONS

European Telecommunications Standards Institute (ETSI), "Multi-access Edge Computing (MEC); Device application Interface", Multi-access Edge Computing (MEC) ETSI Industry Specification Group (ISG), ETSI GS MEC 016 V2.2.1, Apr. 2020, 28 pages.

(Continued)

*Primary Examiner* — Tonia L Dollinger
*Assistant Examiner* — Mehulkumar J Shah
(74) *Attorney, Agent, or Firm* — Mark D. Pratt

(57) ABSTRACT

Methods, apparatuses, systems, etc., directed to a wireless transmit/receive unit (WTRU) for integrating a constrained MEC host in a MEC system are disclosed herein. In an embodiment, the WTRU may obtain information indicating at least one multi-access edge computing (MEC) resource available for integration by a MEC system, wherein the MEC system supports a plurality of types of MEC resources available for integration, and wherein the at least one MEC resource is a subset of the plurality of types of MEC (Continued)

resources supported by the MEC system; may transmit to the MEC system, information indicating at least one MEC resource, to be integrated by the MEC system, from the at least one MEC resource available for integration by the MEC system; and may receive from the MEC system, information indicating an integration by the MEC system of the at least one indicated MEC resource.

26 Claims, 24 Drawing Sheets

(51) Int. Cl.
  H04L 67/52          (2022.01)
  H04L 67/59          (2022.01)

(56)                      References Cited

U.S. PATENT DOCUMENTS

| | | | | |
|---|---|---|---|---|
| 2020/0296054 | A1* | 9/2020 | Asawa | H04L 47/821 |
| 2020/0404069 | A1* | 12/2020 | Li | H04L 67/59 |
| 2021/0176613 | A1* | 6/2021 | Purkayastha | H04W 4/02 |
| 2021/0306372 | A1* | 9/2021 | Koral | H04L 63/1458 |
| 2022/0052961 | A1* | 2/2022 | Chauhan | H04L 47/82 |
| 2022/0103617 | A1* | 3/2022 | Campbell | H04L 67/101 |
| 2022/0255878 | A1* | 8/2022 | Ono | H04W 24/02 |
| 2023/0075258 | A1* | 3/2023 | Featherstone | G06F 9/5061 |

OTHER PUBLICATIONS

Bernardos et al., "Terminal-based joint selection and configuration of MEC host and RAW network", Internet Engineering Task Force (IETF), Internet-Draft, draft-bernardos-raw-joint-selection-raw-mec-00, Feb. 22, 2021, 14 pages.

European Telecommunications Standards Institute (ETSI), "Multi-access Edge Computing (MEC); Study on MEC in resource constrained terminals, fixed or mobile", Multi-access Edge Computing (MEC) ETSI Industry Specification Group (ISG), Draft ETSI GR MEC 036 V3.0.3, Oct. 2020, 17 pages.

European Telecommunications Standards Institute (ETSI), "Multi-access Edge Computing (MEC); Framework and Reference Architecture", Multi-access Edge Computing (MEC) ETSI Industry Specification Group (ISG), ETSI GS MEC 003 V2.1.1, Jan. 2019, 21 pages.

Bernardos et al., "Extensions to enable wireless reliability and availability in multi-access edge deployments", Internet Engineering Task Force (IETF), Internet-Draft, draft-bernardos-raw-mec-00, Jul. 27, 2020, 30 pages.

Nkenyereye et al., "MEIX: Evolving Multi-Access Edge Computing for Industrial Internet-of-Things Services", Institute of Electrical and Electronics Engineers (IEEE), IEEE Network, vol. 35, Issue 3, May/Jun. 2021, 7 pages.

Kekki et al., "MEC in 5G networks", European Telecommunications Standards Institute (ETSI), ETSI White Paper No. 28, First Edition, Jun. 2018, 28 pages.

* cited by examiner

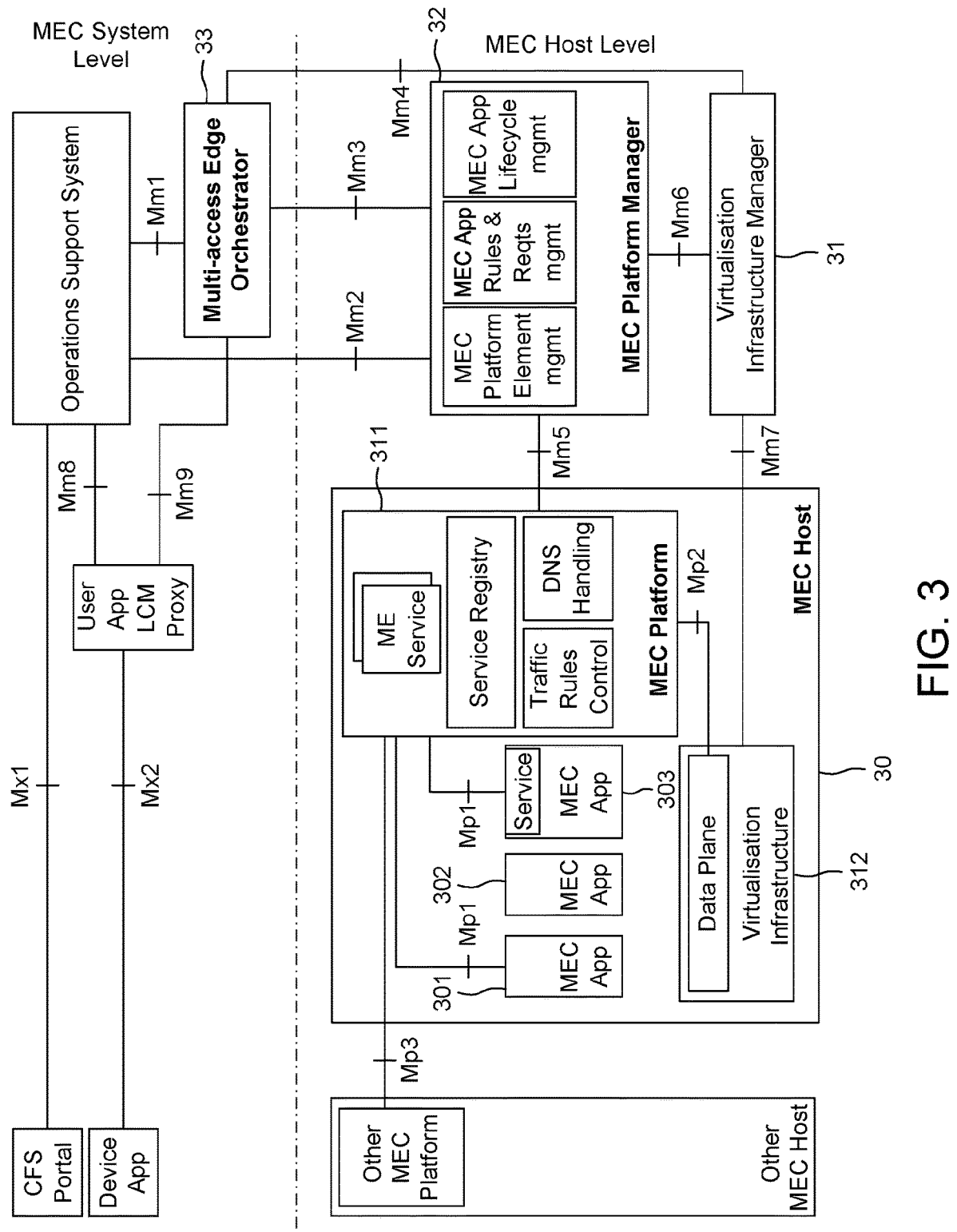

MEC System Level

MEC Host Level

Operations Support System

Multi-access Edge Orchestrator    33

CFS Portal

Device App

User App LCM Proxy

Mm1

Mm2

Mm3

Mm4    32

Mm5

Mm6

Mm7

Mm8

Mm9

Mx1

Mx2

MEC Platform Manager

MEC App Lifecycle mgmt

MEC App Rules & Reqts mgmt

MEC Platform Element mgmt

Virtualisation Infrastructure Manager    31

MEC Platform

ME Service    311

Service Registry

DNS Handling

Traffic Rules Control

Mp2

MEC App    Service    303

MEC App    302

MEC App    301

Mp1

Mp1

Mp3

Data Plane

Virtualisation Infrastructure    312

MEC Host    30

Other MEC Platform

Other MEC Host

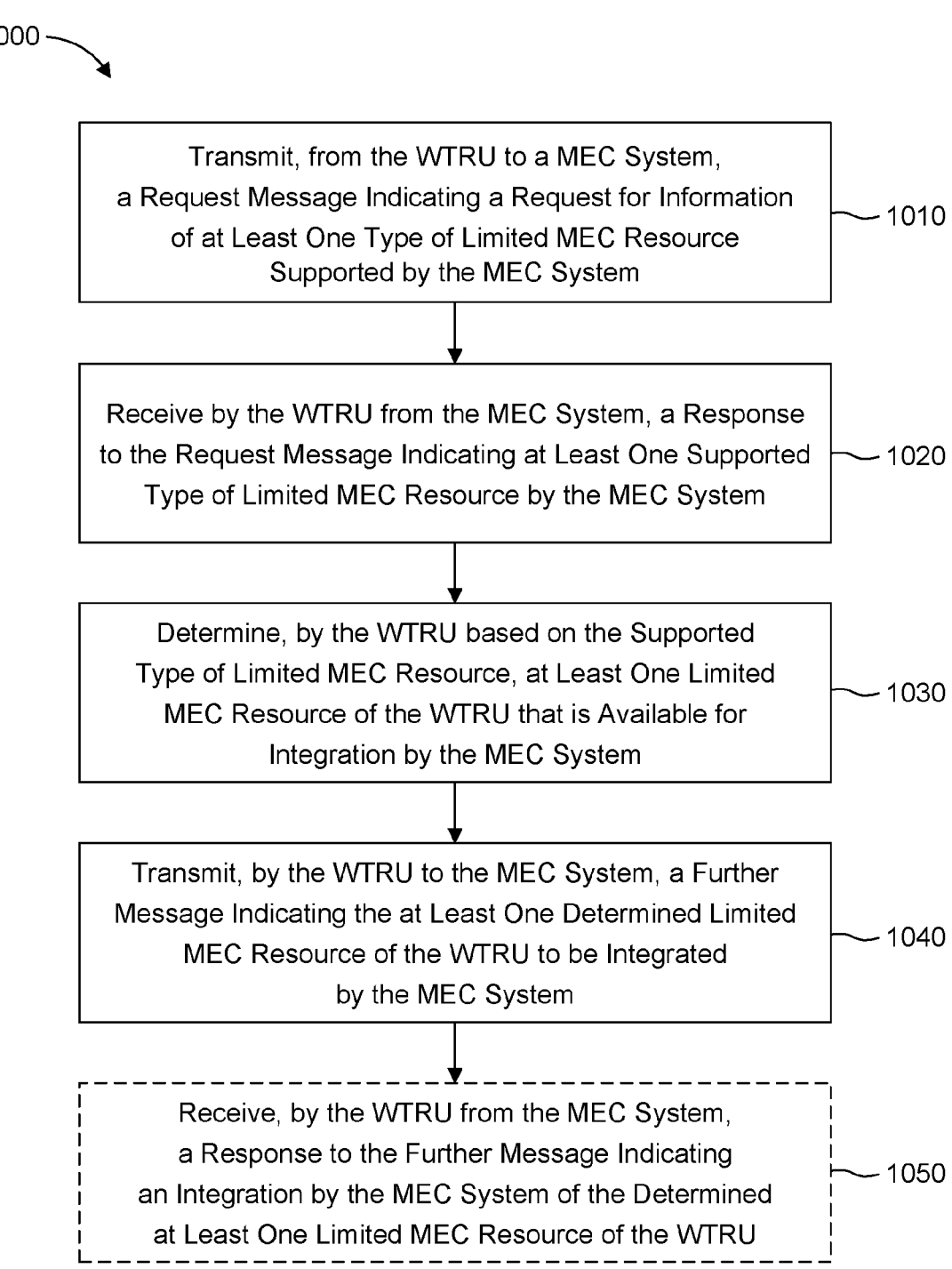

Transmit, from the WTRU to a MEC System,
a Request Message Indicating a Request for Information
of at Least One Type of Limited MEC Resource
Supported by the MEC System — 1010

Receive by the WTRU from the MEC System, a Response
to the Request Message Indicating at Least One Supported
Type of Limited MEC Resource by the MEC System — 1020

Determine, by the WTRU based on the Supported
Type of Limited MEC Resource, at Least One Limited
MEC Resource of the WTRU that is Available for
Integration by the MEC System — 1030

Transmit, by the WTRU to the MEC System, a Further
Message Indicating the at Least One Determined Limited
MEC Resource of the WTRU to be Integrated
by the MEC System — 1040

Receive, by the WTRU from the MEC System,
a Response to the Further Message Indicating
an Integration by the MEC System of the Determined
at Least One Limited MEC Resource of the WTRU — 1050

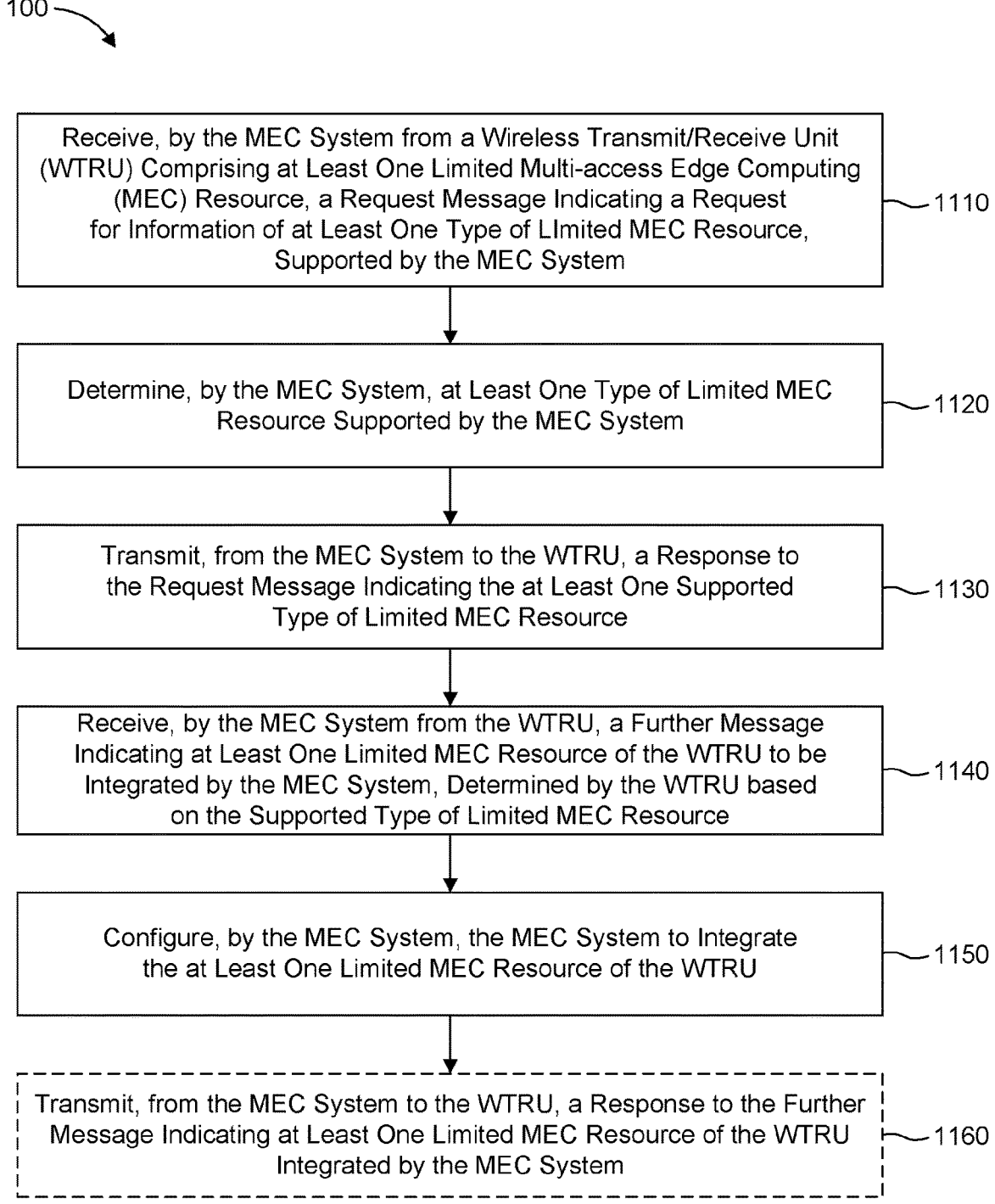

Receive, by the MEC System from a Wireless Transmit/Receive Unit (WTRU) Comprising at Least One Limited Multi-access Edge Computing (MEC) Resource, a Request Message Indicating a Request for Information of at Least One Type of LImited MEC Resource, Supported by the MEC System — 1110

Determine, by the MEC System, at Least One Type of Limited MEC Resource Supported by the MEC System — 1120

Transmit, from the MEC System to the WTRU, a Response to the Request Message Indicating the at Least One Supported Type of Limited MEC Resource — 1130

Receive, by the MEC System from the WTRU, a Further Message Indicating at Least One Limited MEC Resource of the WTRU to be Integrated by the MEC System, Determined by the WTRU based on the Supported Type of Limited MEC Resource — 1140

Configure, by the MEC System, the MEC System to Integrate the at Least One Limited MEC Resource of the WTRU — 1150

Transmit, from the MEC System to the WTRU, a Response to the Further Message Indicating at Least One Limited MEC Resource of the WTRU Integrated by the MEC System — 1160

FIG. 11

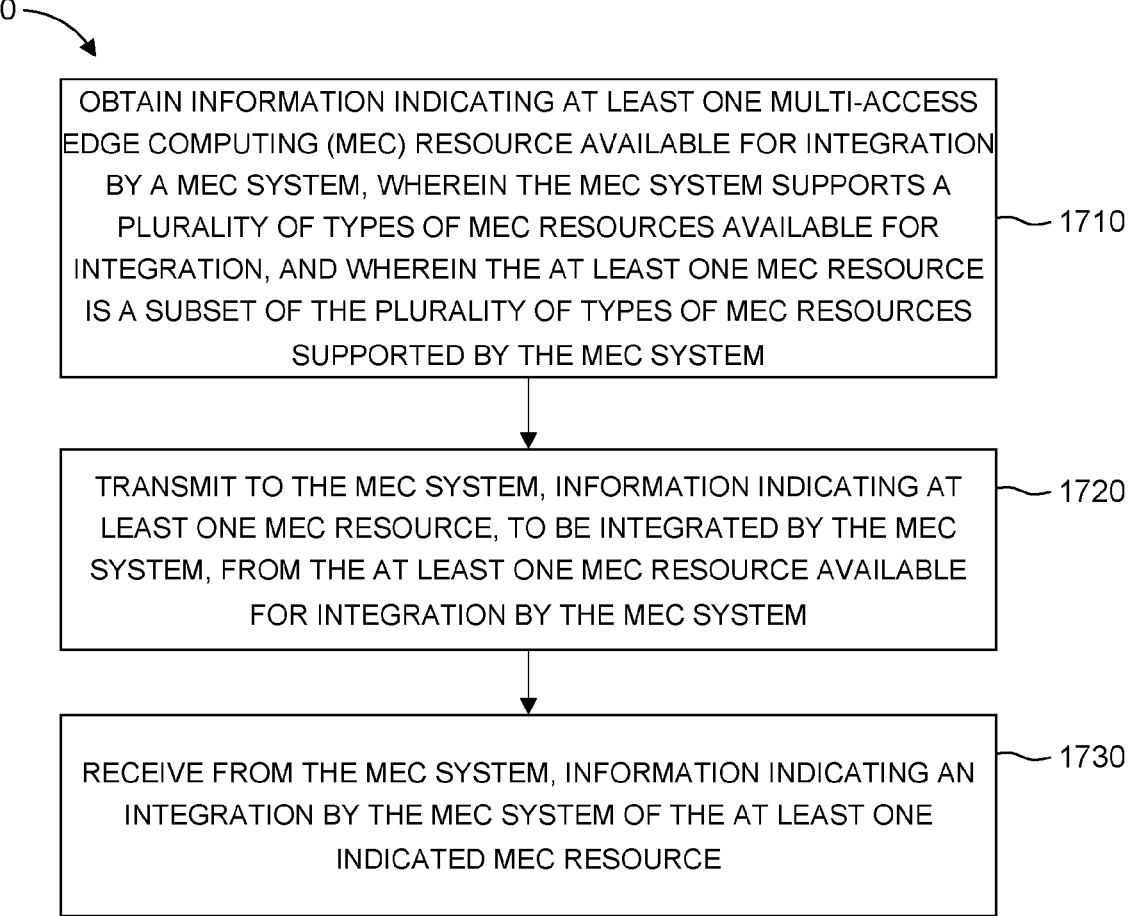

1700

OBTAIN INFORMATION INDICATING AT LEAST ONE MULTI-ACCESS EDGE COMPUTING (MEC) RESOURCE AVAILABLE FOR INTEGRATION BY A MEC SYSTEM, WHEREIN THE MEC SYSTEM SUPPORTS A PLURALITY OF TYPES OF MEC RESOURCES AVAILABLE FOR INTEGRATION, AND WHEREIN THE AT LEAST ONE MEC RESOURCE IS A SUBSET OF THE PLURALITY OF TYPES OF MEC RESOURCES SUPPORTED BY THE MEC SYSTEM — 1710

TRANSMIT TO THE MEC SYSTEM, INFORMATION INDICATING AT LEAST ONE MEC RESOURCE, TO BE INTEGRATED BY THE MEC SYSTEM, FROM THE AT LEAST ONE MEC RESOURCE AVAILABLE FOR INTEGRATION BY THE MEC SYSTEM — 1720

RECEIVE FROM THE MEC SYSTEM, INFORMATION INDICATING AN INTEGRATION BY THE MEC SYSTEM OF THE AT LEAST ONE INDICATED MEC RESOURCE — 1730

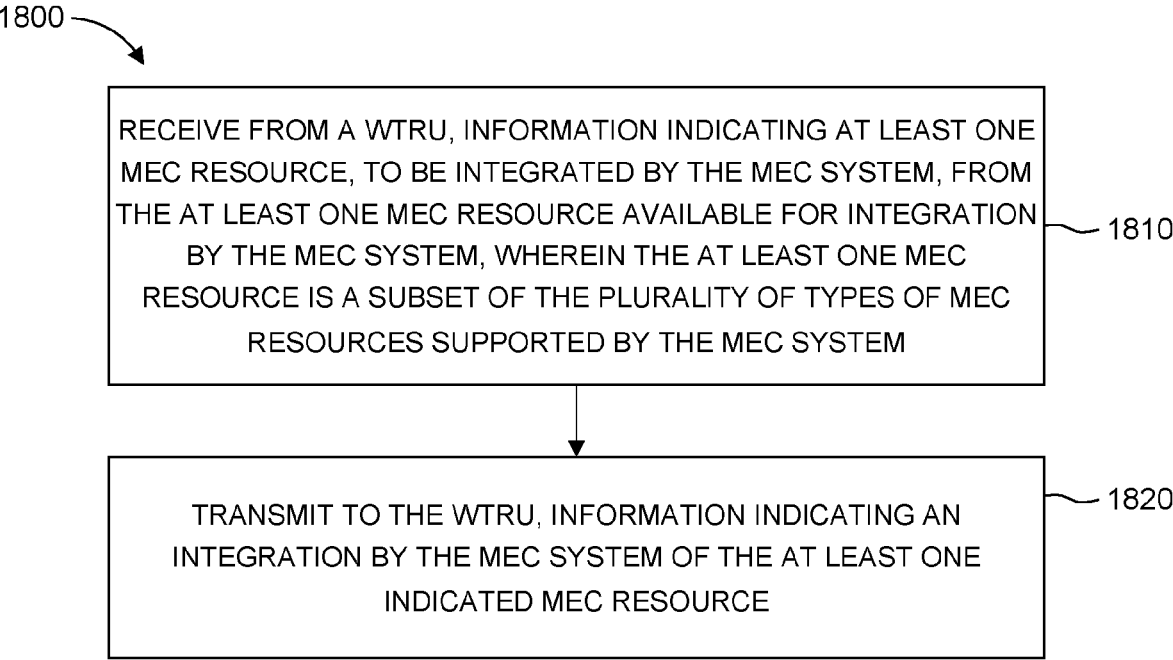

RECEIVE FROM A WTRU, INFORMATION INDICATING AT LEAST ONE MEC RESOURCE, TO BE INTEGRATED BY THE MEC SYSTEM, FROM THE AT LEAST ONE MEC RESOURCE AVAILABLE FOR INTEGRATION BY THE MEC SYSTEM, WHEREIN THE AT LEAST ONE MEC RESOURCE IS A SUBSET OF THE PLURALITY OF TYPES OF MEC RESOURCES SUPPORTED BY THE MEC SYSTEM — 1810

TRANSMIT TO THE WTRU, INFORMATION INDICATING AN INTEGRATION BY THE MEC SYSTEM OF THE AT LEAST ONE INDICATED MEC RESOURCE — 1820

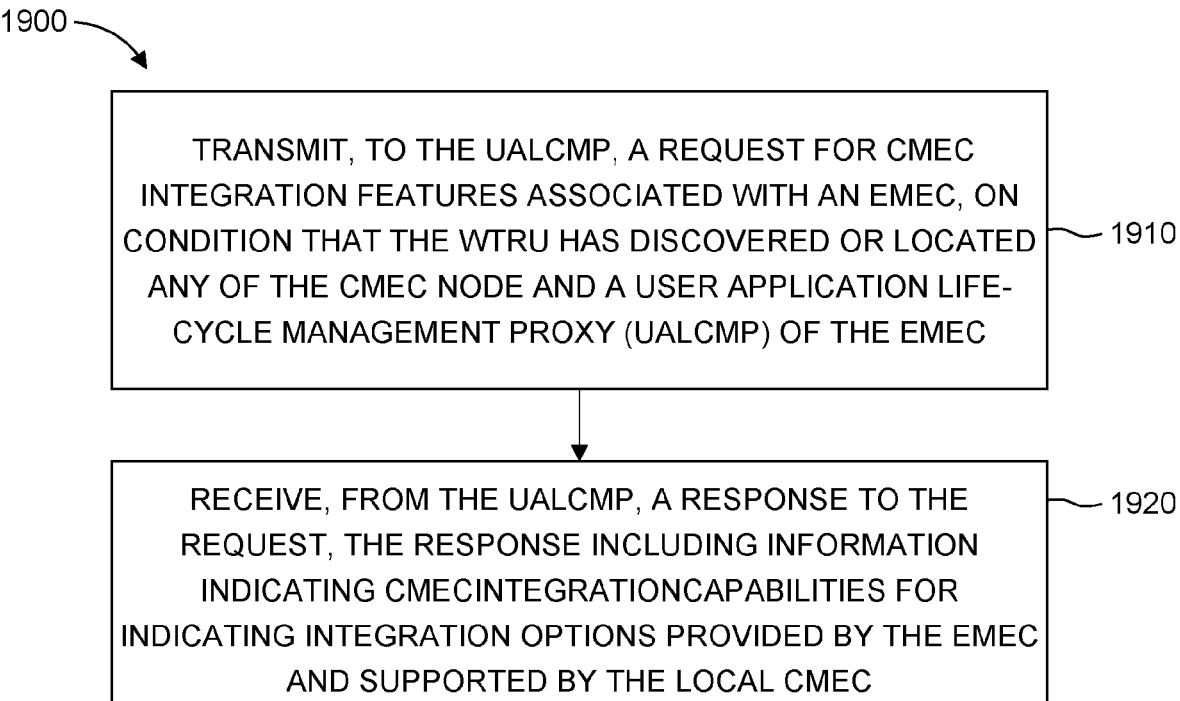

TRANSMIT, TO THE UALCMP, A REQUEST FOR CMEC INTEGRATION FEATURES ASSOCIATED WITH AN EMEC, ON CONDITION THAT THE WTRU HAS DISCOVERED OR LOCATED ANY OF THE CMEC NODE AND A USER APPLICATION LIFE-CYCLE MANAGEMENT PROXY (UALCMP) OF THE EMEC — 1910

RECEIVE, FROM THE UALCMP, A RESPONSE TO THE REQUEST, THE RESPONSE INCLUDING INFORMATION INDICATING CMECINTEGRATIONCAPABILITIES FOR INDICATING INTEGRATION OPTIONS PROVIDED BY THE EMEC AND SUPPORTED BY THE LOCAL CMEC — 1920

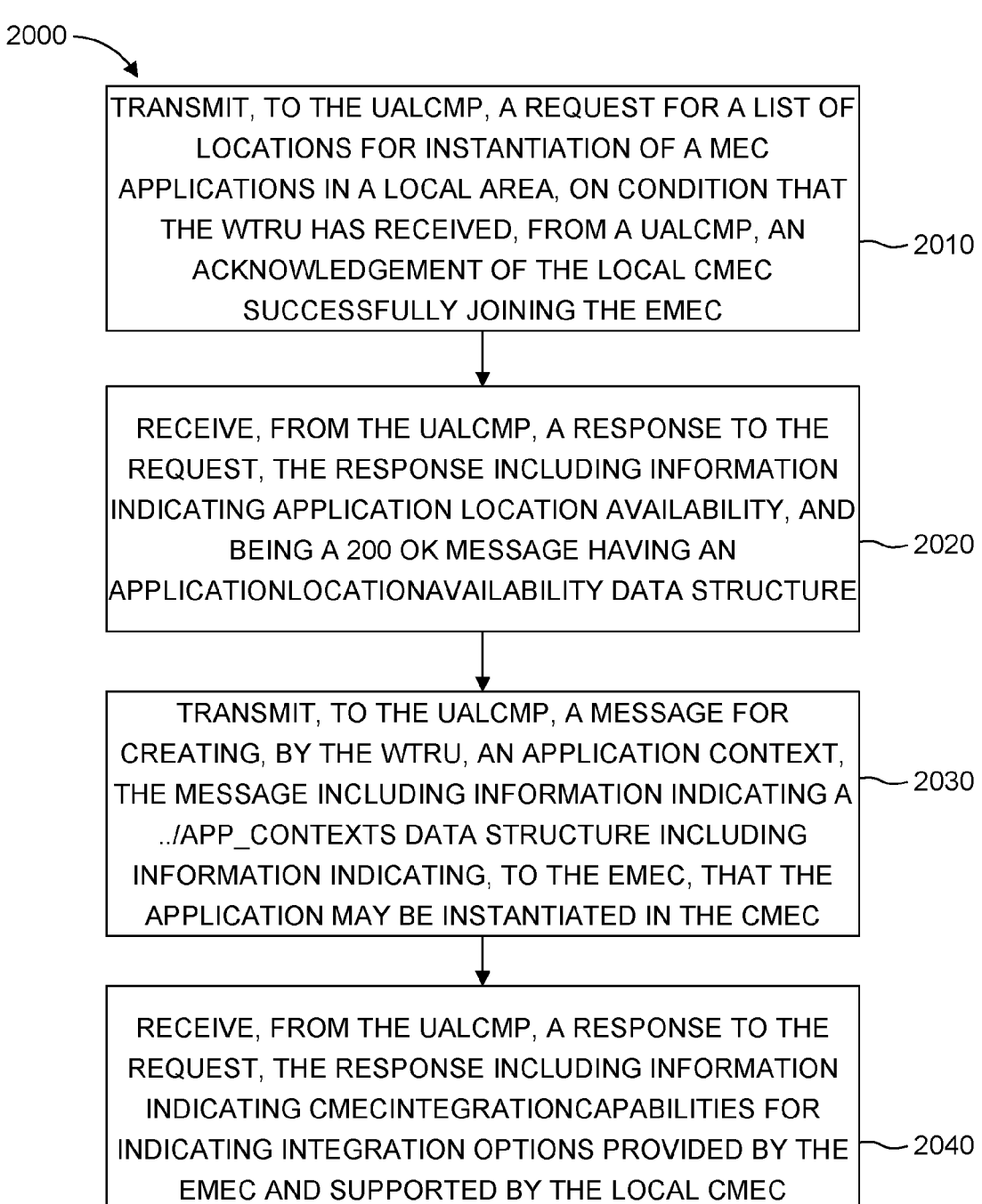

TRANSMIT, TO THE UALCMP, A REQUEST FOR A LIST OF LOCATIONS FOR INSTANTIATION OF A MEC APPLICATIONS IN A LOCAL AREA, ON CONDITION THAT THE WTRU HAS RECEIVED, FROM A UALCMP, AN ACKNOWLEDGEMENT OF THE LOCAL CMEC SUCCESSFULLY JOINING THE EMEC — 2010

RECEIVE, FROM THE UALCMP, A RESPONSE TO THE REQUEST, THE RESPONSE INCLUDING INFORMATION INDICATING APPLICATION LOCATION AVAILABILITY, AND BEING A 200 OK MESSAGE HAVING AN APPLICATIONLOCATIONAVAILABILITY DATA STRUCTURE — 2020

TRANSMIT, TO THE UALCMP, A MESSAGE FOR CREATING, BY THE WTRU, AN APPLICATION CONTEXT, THE MESSAGE INCLUDING INFORMATION INDICATING A ../APP_CONTEXTS DATA STRUCTURE INCLUDING INFORMATION INDICATING, TO THE EMEC, THAT THE APPLICATION MAY BE INSTANTIATED IN THE CMEC — 2030

RECEIVE, FROM THE UALCMP, A RESPONSE TO THE REQUEST, THE RESPONSE INCLUDING INFORMATION INDICATING CMECINTEGRATIONCAPABILITIES FOR INDICATING INTEGRATION OPTIONS PROVIDED BY THE EMEC AND SUPPORTED BY THE LOCAL CMEC — 2040

FIG. 20

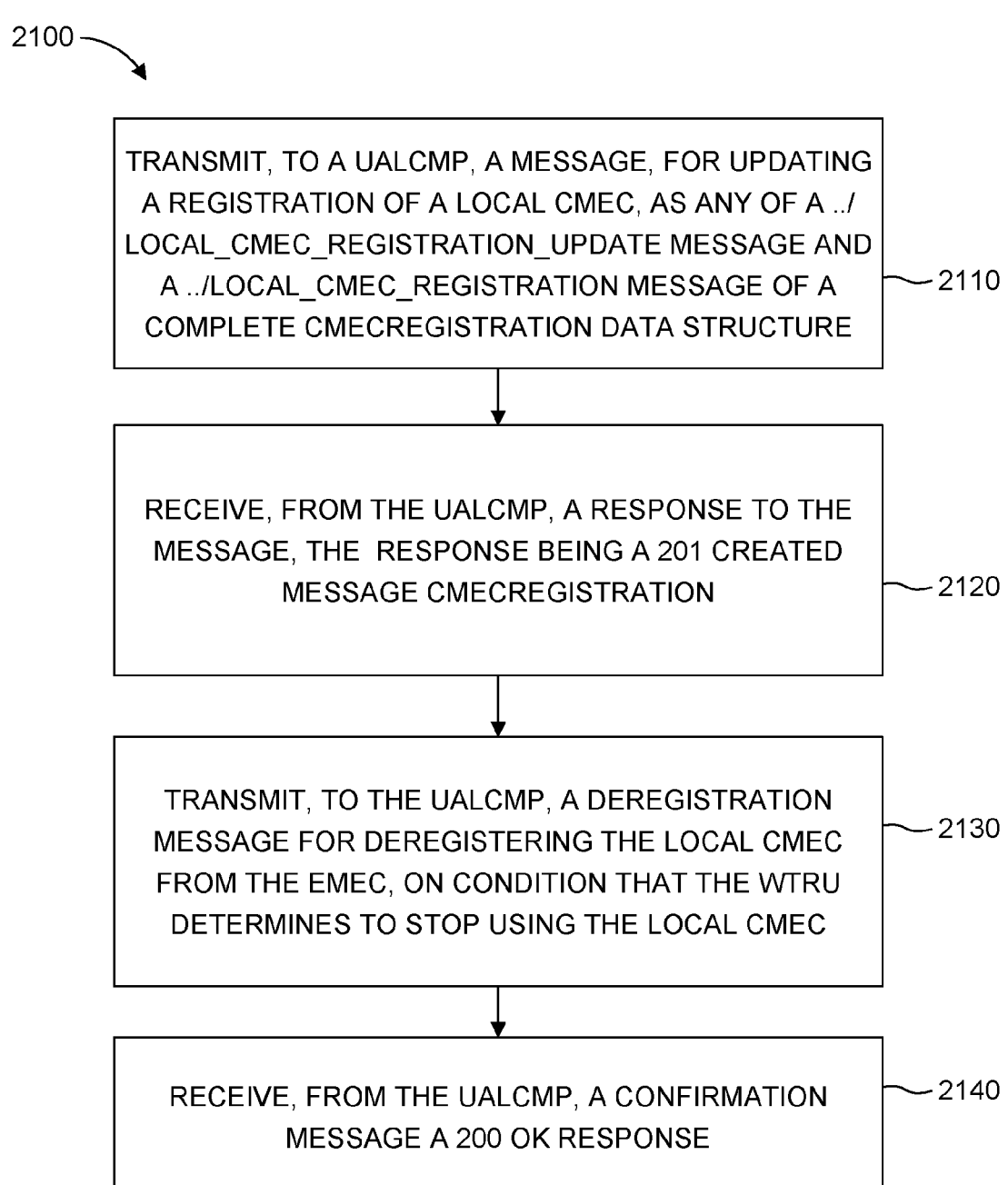

2100

TRANSMIT, TO A UALCMP, A MESSAGE, FOR UPDATING A REGISTRATION OF A LOCAL CMEC, AS ANY OF A ../ LOCAL_CMEC_REGISTRATION_UPDATE MESSAGE AND A ../LOCAL_CMEC_REGISTRATION MESSAGE OF A COMPLETE CMECREGISTRATION DATA STRUCTURE — 2110

RECEIVE, FROM THE UALCMP, A RESPONSE TO THE MESSAGE, THE RESPONSE BEING A 201 CREATED MESSAGE CMECREGISTRATION — 2120

TRANSMIT, TO THE UALCMP, A DEREGISTRATION MESSAGE FOR DEREGISTERING THE LOCAL CMEC FROM THE EMEC, ON CONDITION THAT THE WTRU DETERMINES TO STOP USING THE LOCAL CMEC — 2130

RECEIVE, FROM THE UALCMP, A CONFIRMATION MESSAGE A 200 OK RESPONSE — 2140

FIG. 21

METHODS, APPARATUSES AND SYSTEMS FOR INTEGRATING CONSTRAINED MULTI-ACCESS EDGE COMPUTING HOST IN MULTI-ACCESS EDGE COMPUTING SYSTEM

CROSS-REFERENCE TO RELATED APPLICATIONS

This application is a U.S. National Stage Application under 35 U.S.C. 371 of International Patent Application No PCT/US2022/018598, filed Mar. 3, 2022, which claims the benefit of U.S. Provisional Patent Application Nos. (i) 63/156,500 filed Mar. 4, 2021, and (ii) 63/156,599 filed Mar. 4, 2021; each of which is incorporated herein by reference.

FIELD

The embodiments relate to the field of computing and communications and, more particularly, to methods, apparatus, systems, architectures and interfaces for computing and communications in an advanced or next generation wireless communication system, including communications carried out using a new radio and/or new radio (NR) access technology and communication systems. Such NR access and technology, which may also be referred to as 5G networks and technology, and/or other similar wireless communication systems and technology may include capabilities for Multi-access Edge Computing (MEC), for example, such as that discussed in or by the European Telecommunications Standards Institute (ETSI) Industry Specification Group (ISG) MEC working group. For example, use cases such as automation of vehicles, such as cars and drones, real-time augmented reality, immersive gaming, etc. represent only a few technologically advanced use cases that may need edge computing, for example, for low latency support.

Multi-access Edge Computing provides consumers and enterprise customers with vertical business segments and services, and allows for software applications to access/use local content and real-time information about local-access network conditions. Further, mobile core networks are alleviated of further congestion (e.g., to efficiently serve local purposes) when services and caching content are deployed at the network edge. Additionally, edge computing may be view as needed (e.g., necessary) to enable a variety of technologically advanced use cases, such as, for example, vehicle/drone automation, real-time augmented reality/virtual augmented reality, and immersive gaming.

BRIEF DESCRIPTION OF THE DRAWINGS

A more detailed understanding may be had from the following description, given by way of example in conjunction with the accompanying drawings. Figures in such drawings, like the detailed description, are examples. As such, the Figures and the detailed description are not to be considered limiting, and other equally effective examples are possible and likely. Furthermore, like reference numerals in the figures indicate like elements.

FIG. 3 is a system diagram illustrating an example of the ETSI MEC reference architecture;

FIG. 10 is a diagram illustrating an example of a method, implemented by a WTRU, for integrating at least one limited MEC resource of the WTRU in a MEC system;

FIG. 11 is a diagram illustrating an example of a method, implemented by a MEC system, for integrating at least one limited MEC resource of a WTRU in the MEC system;

FIG. 17 is a diagram illustrating an example of a method, implemented by a MEC system, for integrating at least one limited MEC resource in the MEC system;

FIG. 18 is a diagram illustrating an example of a method, implemented by a MEC system, wherein the MEC system may support a plurality of types of MEC resources available for integration;

FIG. 19 is a diagram illustrating an example of a method, implemented by a WTRU for any of registering and connecting a cMEC node included in an edge-MEC (eMEC);

FIG. 20 is a diagram illustrating an example of a method, implemented by a WTRU for any of discovering a local cMEC, and instantiating a MEC user application for creating a context via query and asynchronous notification with an eMEC; and FIG. 21 is a diagram illustrating an example of a method, implemented by a WTRU for any of updating registration and de-registering of a cMEC with an eMEC.

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein. Although various embodiments are described and/or claimed herein in which an apparatus, system, device, etc. and/or any element thereof carries out an operation, process, algorithm, function, etc. and/or any portion thereof, it is to be understood that any embodiments described and/or claimed herein assume that any apparatus, system, device, etc. and/or any element thereof is configured to carry out any operation, process, algorithm, function, etc. and/or any portion thereof.

Example Communications Networks

The methods, apparatuses and systems provided herein are well-suited for communications involving both wired and wireless networks. An overview of various types of wireless devices and infrastructure is provided with respect to FIGS. 1A-1D, where various elements of the network may utilize, perform, be arranged in accordance with and/or be adapted and/or configured for the methods, apparatuses and systems provided herein.

Figure 1A:
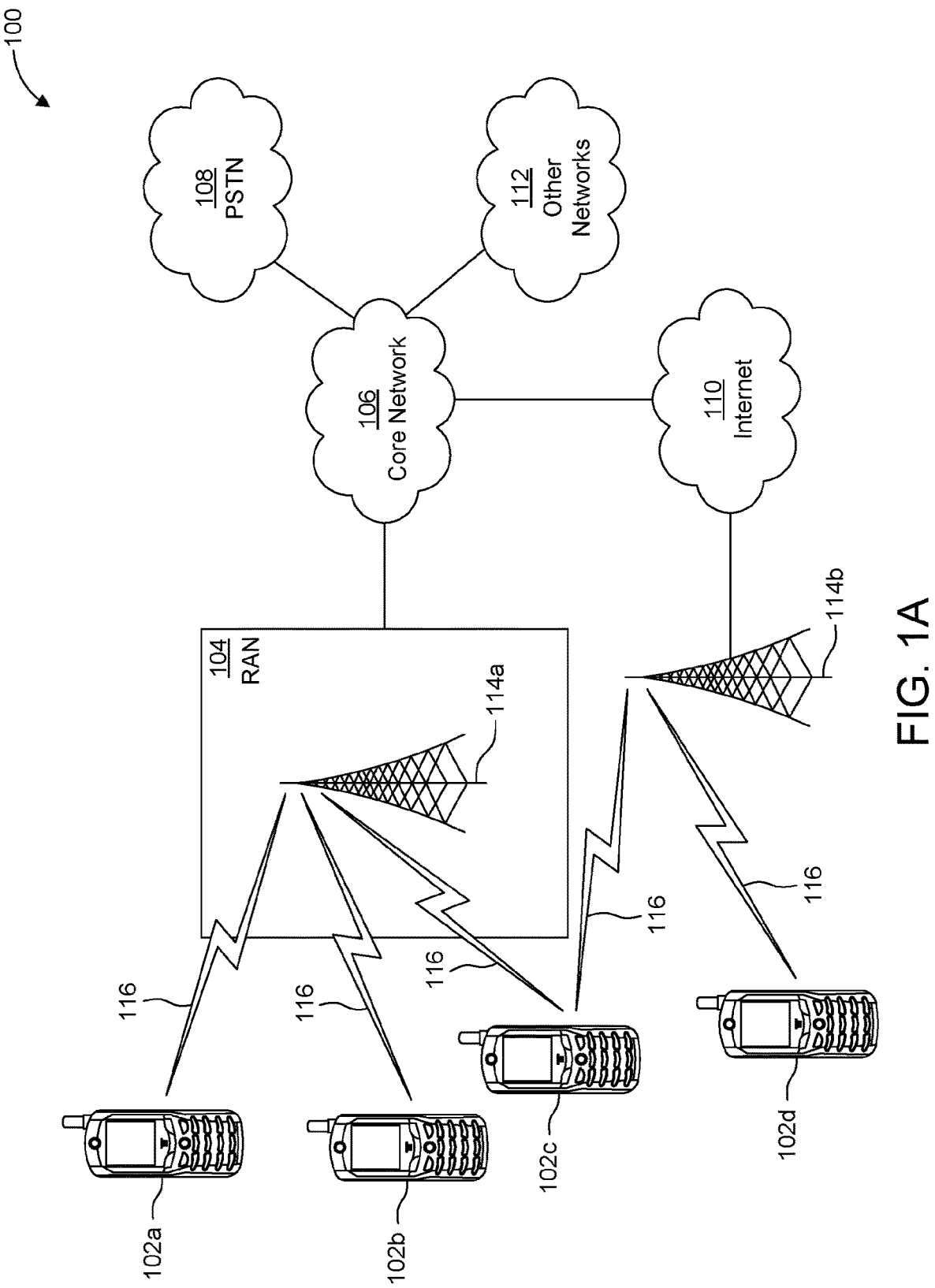
FIG. 1A is a system diagram illustrating an example communications system in which one or more disclosed embodiments may be implemented.

FIG. 1A is a system diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail (ZT) unique-word (UW) discreet Fourier transform (DFT) spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104/113, a core network (CN) 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include (or be) a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d, e.g., to facilitate access to one or more communication networks, such as the CN 106/115, the Internet 110, and/or the networks 112. By way of example, the base stations 114a, 114b may be any of a base transceiver station (BTS), a Node-B (NB), an eNode-B (eNB), a Home Node-B (HNB), a Home eNode-B (HeNB), a gNode-B (gNB), a NR Node-B (NR NB), a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in an embodiment, the base station 114a may include three transceivers, i.e., one for each sector of the cell. In an embodiment, the base station 114a may employ multiple-input multiple output (MIMO) technology and may utilize multiple transceivers for each or any sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In an embodiment, the base station 114a and the WTRUs 102a, 102b, 102c may implement radio technologies such as IEEE 802.11 (i.e., Wireless Fidelity (Wi-Fi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node-B, Home eNode-B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In an embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In an embodiment, the base station 114b and the WTRUs 102c, 102d may utilize a cellular-based RAT (e.g., WCDMA, CDMA2000, GSM, LTE, LTE-A, LTE-A Pro, NR, etc.) to establish any of a small cell, picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing an NR radio technology, the CN 106/115 may also be in communication with another RAN (not shown) employing any of a GSM, UMTS, CDMA 2000, WiMAX, E-UTRA, or Wi-Fi radio technology.

The CN 106/115 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/114 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
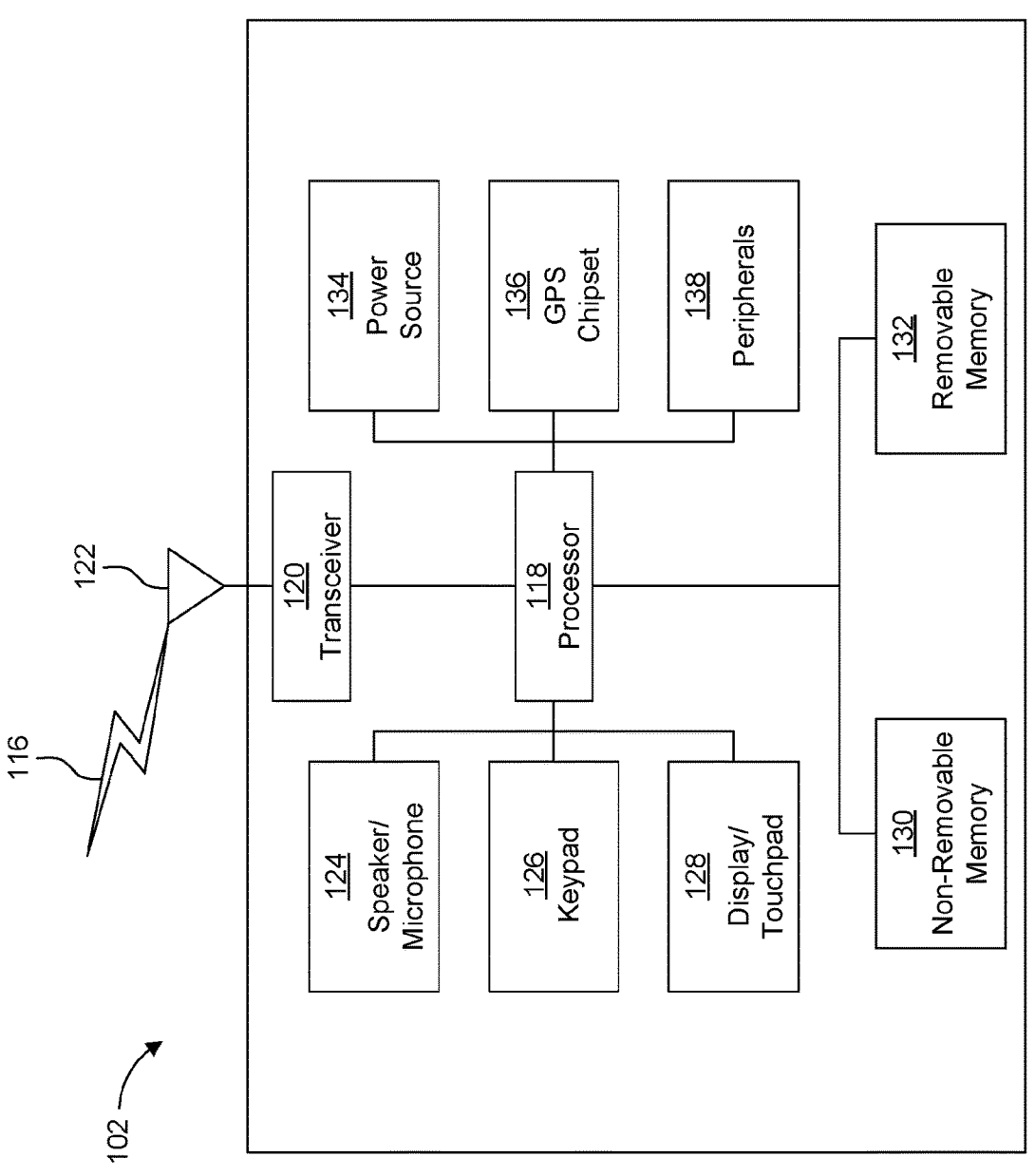
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other elements/peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together, e.g., in an electronic package or chip.

The transmit/receive element 122 may be configured to transmit signals to, or receive signals from, a base station (e.g., the base station 114a) over the air interface 116. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In an embodiment, the transmit/receive element 122 may be configured to transmit and/or receive both RF and light signals.

It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. For example, the WTRU 102 may employ MIMO technology. Thus, in an embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other elements/peripherals 138, which may include one or more software and/or hardware modules/units that provide additional features, functionality and/or wired or wireless connectivity. For example, the elements/peripherals 138 may include an accelerometer, an e-compass, a satellite transceiver, a digital camera (e.g., for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a virtual reality and/or augmented reality (VR/AR) device, an activity tracker, and the like. The elements/peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the uplink (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the uplink (e.g., for transmission) or the downlink (e.g., for reception)).

Figure 1C:
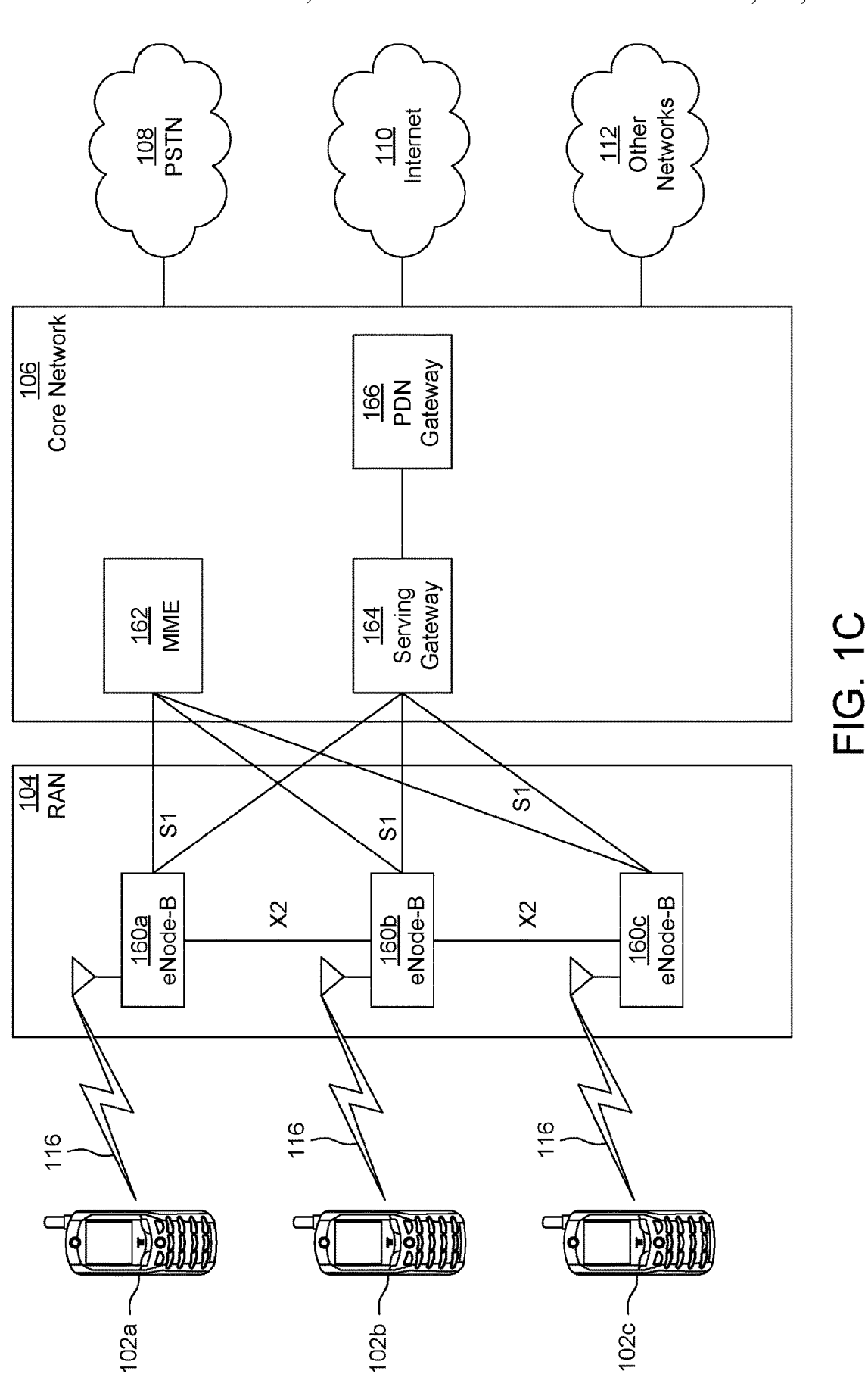
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, and 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink (UL) and/or downlink (DL), and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While each of the foregoing elements are depicted as part of the CN 106, it will be appreciated that any one of these elements may be owned and/or operated by an entity other than the CN operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode-Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode-B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in infrastructure basic service set (BSS) mode may have an access point (AP) for the BSS and one or more stations (STAs) associated with the AP. The AP may have an access or an interface to a distribution system (DS) or another type of wired/wireless network that carries traffic into and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier sense multiple access with collision avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High throughput (HT) STAs may use a 40 MHz wide channel for communication, for example, via a combination of the primary 20 MHz channel with an adjacent or nonadjacent 20 MHz channel to form a 40 MHz wide channel.

Very high throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse fast fourier transform (IFFT) processing, and time domain processing, may be done on each stream separately. The streams may be mapped on to the two 80 MHz channels, and the data may be transmitted by a transmitting STA. At the receiver of the receiving STA, the above-described operation for the 80+80 configuration may be reversed, and the combined data may be sent to a medium access control (MAC) layer, entity, etc.

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV white space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support meter type control/machine-type communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or network allocation vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
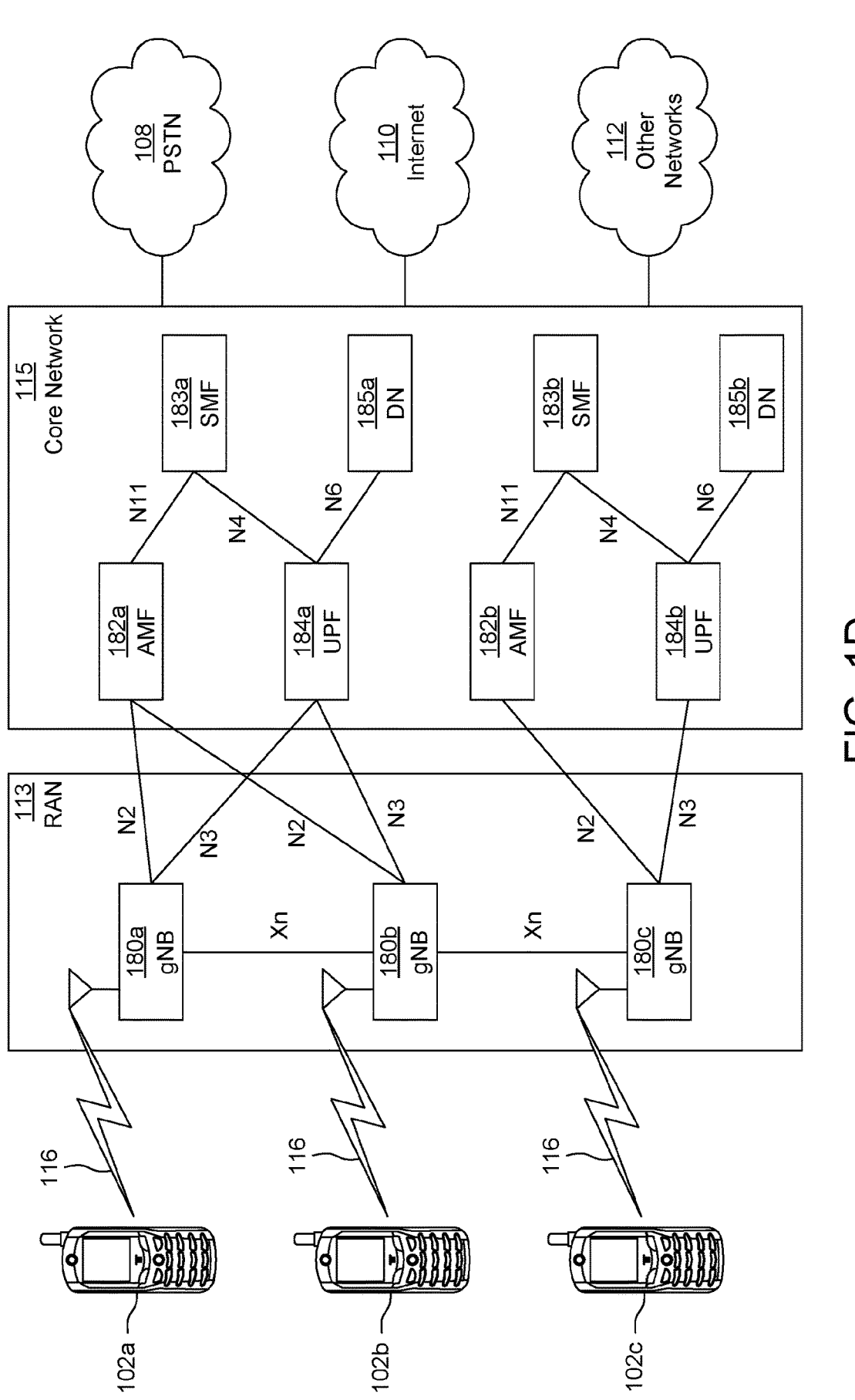
FIG. 1D is a system diagram illustrating a further example RAN and a further example of a CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In an embodiment, the gNBs 180a, 180b, 180c may implement MIMO technology. For example, gNBs 180a, 180b may utilize beamforming to transmit signals to and/or receive signals from the WTRUs 102a, 102b, 102c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., including a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards user plane functions (UPFs) 184a, 184b, routing of control plane information towards access and mobility management functions (AMFs) 182a, 182b, and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one session management function (SMF) 183a, 183b, and at least one Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of NAS signaling, mobility management, and the like. Network slicing may be used by the AMF 182a, 182b, e.g., to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as Wi-Fi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, e.g., to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In an embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to any of: WTRUs 102a-d, base stations 114a-b, eNode-Bs 160a-c, MME 162, SGW 164, PGW 166, gNBs 180a-c, AMFs 182a-b, UPFs 184a-b, SMFs 183a-b, DNs 185a-b, and/or any other element(s)/device(s) described herein, may be performed by one or more emulation elements/devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Multi-Access Edge Computing Example

MEC capabilities deployed in the edge of a mobile network may enable (e.g., facilitate) dynamic (e.g., and efficient) provision of services to mobile users. Multi-access edge computing may also be referred to as mobile edge computing.

Figure 2:
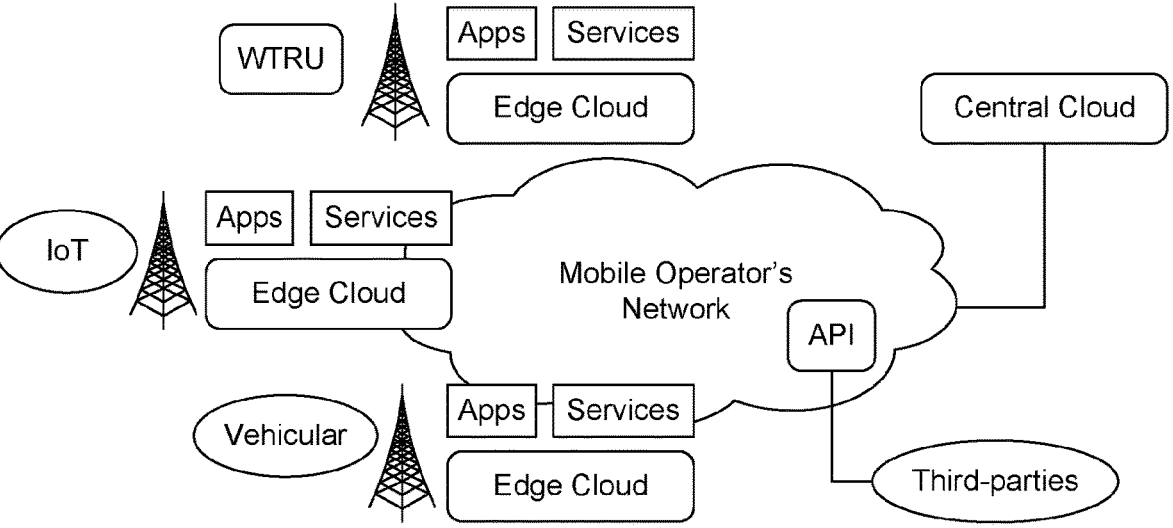
FIG. 2 is a system diagram illustrating an example of a MEC system.

FIG. 2 is a system diagram illustrating an example of a MEC system. The ETSI ISG MEC working group, specifies an open environment for integrating MEC capabilities with service provider networks as illustrated in FIG. 2. The open environment may include applications from e.g., third parties. For example, distributed computing capabilities may allow information technology (IT) infrastructures to be made available e.g., as in a cloud environment, for the deployment of functions in mobile access networks.

FIG. 3 is a system diagram illustrating an example of the ETSI MEC reference architecture. The MEC reference architecture may include functional elements that may comprise the mobile edge systems and reference points between the functional elements. There may be three groups of reference points between system entities. For example, a first group of reference points related to the mobile edge platform functionality may be referred to herein as Mp. A second group of reference points related to management functions may be referred to herein as Mm. A third group of reference points allowing to connect to external entities may be referred to herein a Mx.

For example, the mobile edge system may comprise mobile edge hosts 30 and the mobile edge management (e.g., functions, elements) for running (e.g., executing, offering, providing, etc.) mobile edge applications 301, 302, 303 within (e.g., a subset of) an operator network (e.g., service providers' networks) and/or a subset of (e.g., any part(s) of) an operator network.

A mobile edge host 30 may be seen as an entity comprising a mobile edge platform 311 and a virtualization infrastructure 312 which may provide any of compute, storage, and network resources, for (e.g., the purpose of) running mobile edge applications 301, 302, 303.

A mobile edge platform 311 may be seen as a set (e.g., collection) of functions for running (e.g., executing) mobile edge applications 301, 302, 303 on a (e.g., particular) virtualization infrastructure. The mobile edge platform 311 may enable mobile edge applications 301, 302, 303 to any of provide and consume mobile edge services.

Mobile edge applications (herein, interchangeably referred to as any of MEC Apps and ME Apps) 301, 302, 303 may be instantiated (e.g., started) on the virtualization infrastructure of the mobile edge host, for example, based on configuration requests that may be, for example, validated by the mobile edge management.

The mobile edge management (e.g., functions, elements) may comprise the mobile edge system level management (e.g., functions, elements) and the mobile edge host level management (e.g., functions, elements).

The mobile edge system level management (e.g., functions, elements) may include the mobile edge orchestrator 33, which may have an overview of the (e.g., complete, overall) mobile edge system.

The mobile edge host level management (e.g., functions, elements) may comprise the mobile edge platform manager 32 and the virtualization infrastructure manager 31. The mobile edge host level management (e.g., functions, elements) may handle (e.g., perform) the management of the mobile edge (e.g., specific) functionality of a (e.g., particular) mobile edge host 30 and the applications 301, 302, 303 running on that mobile edge host 30.

Example of Deployment of MEC in 5G

The ETSI MEC ISG published (i.e., in June 2018) White Paper No. 28 titled "MEC in 5G networks," First edition (referred to interchangeably herein as the whitepaper or the ETSI MEC whitepaper), illustrating and discussing ways to deploy and integrate MEC in a 5G architecture. The ETSI MEC ISG whitepaper focuses "on the opportunities for MEC to benefit from the edge computing enablers of the 5G system specification, and for 3GPP ecosystem to benefit from the MEC system and its APIs as a set of complementary capabilities to enable applications and services environments in the very edge of mobile networks".

For example, MEC may be mapped to applications functions (AF), as defined by 3GPP, that may use the services (e.g., and information) provided by other 3GPP network functions based on the configured policies. Enabling functionalities may allow to provide flexible support for different deployments of MEC and to support MEC in case of user mobility events.

Figure 4:
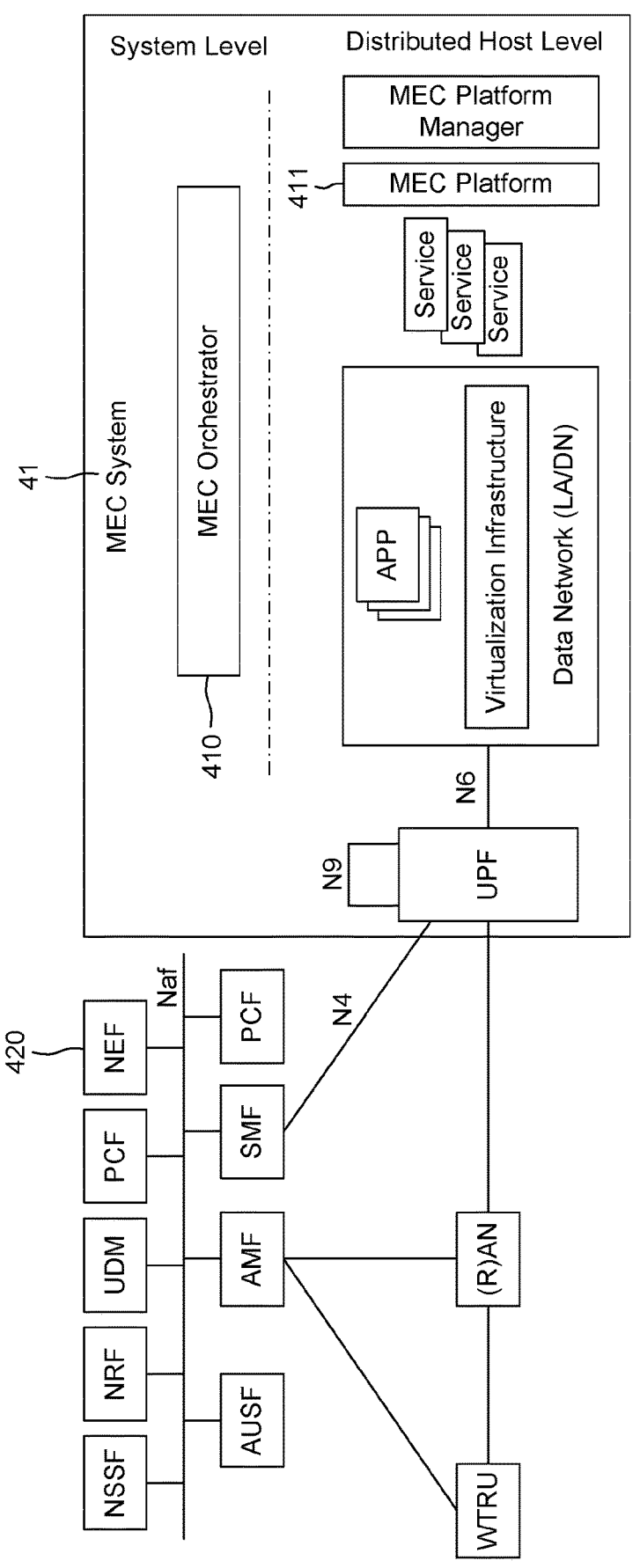
FIG. 4 is a system diagram illustrating an example of a MEC deployment.

FIG. 4 is a system diagram illustrating an example of a MEC deployment in a 5G network. A MEC system 41 may comprise a MEC orchestrator 410. The is a MEC orchestrator 410 may be a system level (e.g., functional) entity that, e.g., by acting as an AF, may interact with any of the network exposure function (NEF) 420, and (e.g., in some scenarios) with (e.g., target) 5G network functions (NFs). On the MEC host level, the MEC system 41 may comprise a MEC platform 411 that may interact with 5G NFs, for example, in the role of an AF. The MEC host, e.g., the host level functional entities (e.g., software components), may be deployed (e.g., located), for example, in a data network in the 5G system. The NEF, e.g., as a core network function may be a system level entity and may be deployed centrally together with other (e.g., similar) NFs. An instance of NEF may also be deployed in the edge to allow any of low latency and high throughput service access from a MEC host. The MEC may be deployed on the N6 reference point, for example, in a data network external to the 5G system.

According to embodiments, different MEC systems may be deployed. For example, MEC hosts may be deployed in the edge of a (e.g., data) network, and the user plane traffic may be steered towards (e.g., targeted) applications in the (e.g., data) network by the user plane function (UPF). In terms of physical deployment of MEC hosts, a MEC host may be collocated with the local UPF in a base station. In another example, a MEC host may be collocated with a transmission network element, e.g., with the local UPF. In yet another example, a MEC host and the local UPF may be collocated with a network aggregation point (e.g., network element). In yet another example, a MEC host may be collocated with the core network functions (e.g., in the same data center).

Example of MEC Capable WTRU

According to embodiments, a WTRU (e.g., terminal unit, mobile host and/or personal device) may be used to support (e.g., host) cloud computing at the edge. For example, the WTRU (which may be also referred to herein as reduced/limited capability/resource MEC WTRU, or MEC capable WTRU), may be the host of a reduced (e.g., limited) capability (e.g., resource) MEC. A reduced capability MEC referred to a device (e.g., WTRU) not comprising all the architecture components of a MEC system standardized by ETSI (which may be also referred to herein as full capability MEC), and/or a device very limited in (e.g., computing resources), and/or a device not comprising all the architecture components of a MEC platform standardized by ETSI (which may be also referred to herein as full capability MEC platform). There are different scenarios where it may be advantageous to enable a reduced capability MEC (sometime referred as Constrained MEC, or CMEC) for deployment on a constrained device (e.g., WTRU), thus allowing MEC applications (sometime referred as apps) to be instantiated on these constrained devices (e.g., WTRUs). Without limitation, different use cases may benefit of such a deployment scenario. For example, vehicular scenarios, where a WTRU may be embedded in a vehicle may run applications for other neighboring WTRUs (e.g., in platooning situations) or for the edge network (for safety and traffic efficiency applications). For example, industry 4.0 scenarios, where mobile robots or robot arms may host MEC applications to minimize the latency required by certain use cases. For example, home gaming scenarios, where WTRUs at the same household may allow to provide (e.g., ultra) low latencies and/or extended computational capabilities to cloud-based gaming applications.

The above listed deployment scenarios may benefit if the MEC capable WTRU may be allowed to offer cloud services dynamically, as and when required and becomes part of the larger edge computing infrastructure. This may allow the reduced capability MEC WTRU to interoperate, share computing with regular telecommunication company edge cloud services. There is also a possibility that these reduced capability WTRUs may be supplied by third party, purchased by a service provider who wants to integrate with a mobile network operator (MNO) infrastructure. For example, an in-vehicle MEC may be installed and managed by the vehicle manufacturer to be fitted in the vehicle, and may be integrated with MNO's edge computing infrastructure, to provide autonomous vehicle services.

The mechanisms standardized by ETSI MEC may not support the use of constrained device (e.g., WTRU) as host of reduced capability/resource MEC and offer cloud services dynamically by being part of the MNOs cloud infrastructure.

Embodiments described herein may allow to dynamically integrate or associate a reduced capability MEC hosted by a WTRU in a larger MNO Edge/cloud infrastructure. Embodiments described herein may allow to integrate these reduced capability MEC WTRUs under the control of the WTRU. For example, embodiments described herein may allow a MEC capable WTRU to expose its reduced capabilities to an existing MEC system, for example through procedures extending the Mx2 interface. For example, embodiments described herein may allow a full capability MEC system deciding on to accept integrating the reduced capabilities MEC (Constrained MEC, CMEC) and using the information exposed by the WTRU to enable the interoperation between the CMEC and the (e.g., full capability MEC system).

Embodiments described herein may not be limited to a mobile phone terminal. For example, a 3GPP connected car or a robot/drone may be applicable to embodiments described herein. Embodiments described herein also be applicable to non-3GPP MEC deployments.

Embodiments described herein may allow the MEC capable WTRU to selectively expose its MEC capabilities to a MEC system. Embodiments described herein may also allow the WTRU to update at any time the capabilities it exposes. For example, a MEC capable WTRU may expose different capabilities to an existing MEC system (e.g., MEC platform), depending on its own capabilities, and/or also on what the MEC capable WTRU may decide/determine to expose to a given MEC system (e.g., MEC platform).

Figure 5:
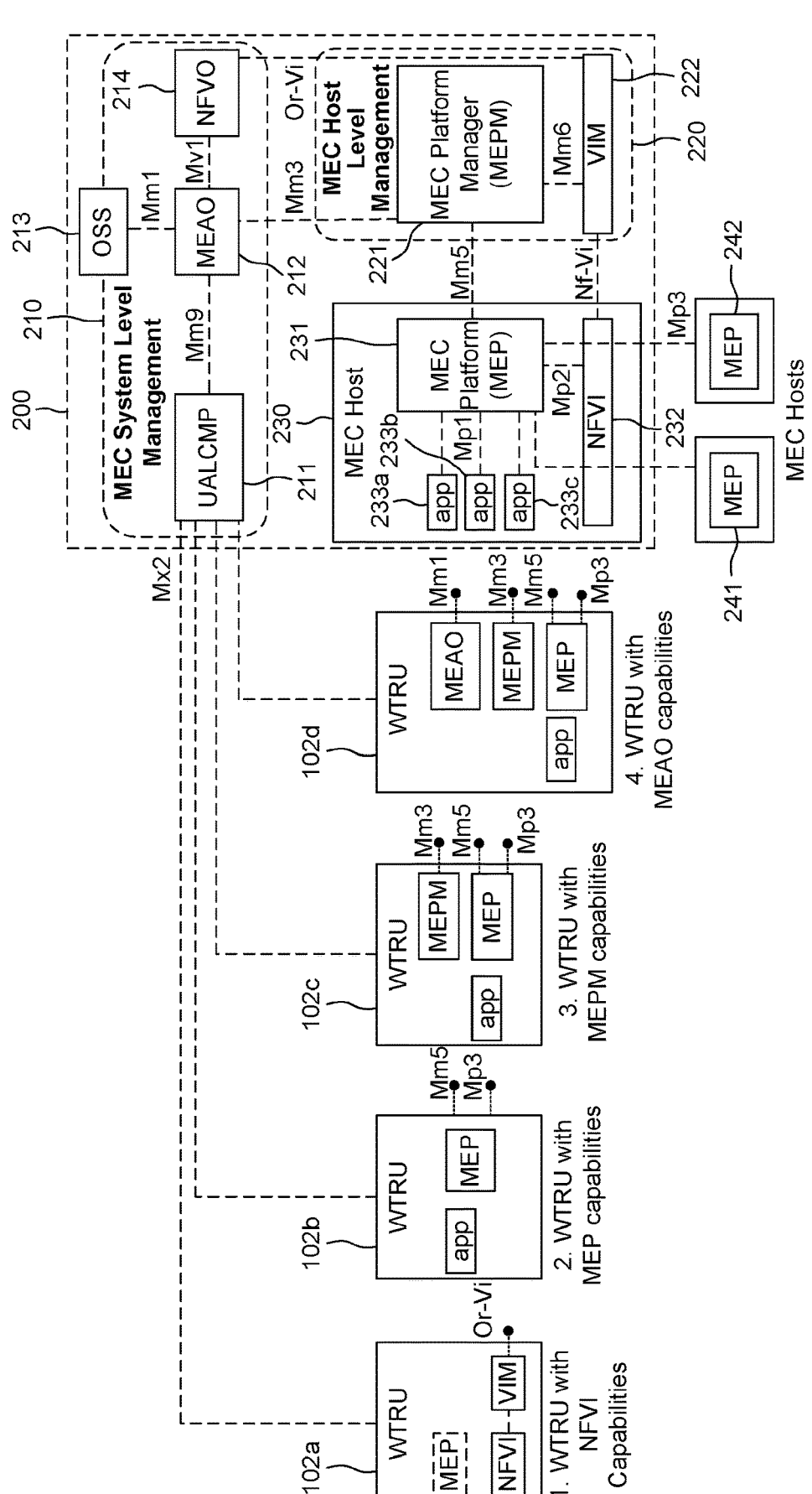
FIG. 5 is a system diagram illustrating an example of different exposures of wireless transmit/receive unit (WTRU) constrained MEC capabilities and ETSI MEC reference points.

FIG. 5 is a system diagram illustrating an example of different exposures of WTRU constrained MEC capabilities and ETSI MEC reference points.

According to embodiments, the WTRU 102 hosting MEC capabilities may comprise at least one limited MEC resource (e.g., capability).

Referring to FIG. 5, the MEC system 200 may include a MEC system level management 210, a MEC host level management 220 and/or a MEC host 230. The MEC system level management 210 may include a user life cycle management proxy (UALCMP) 211, a MEC application orchestrator (MEAO) 212, an operations support system (OSS) 213, and a network functions virtualization (NFV) orchestrator (NFVO) 214. The UALCMP 211 may communicate with the MEAO 212 using a Mm9 interface. The MEAO 212 may communicate with the OSS 213 using a Mm1 interface and with the NFVO 214 using a Mv1 interface. The MEC host level management 220 may include a MEC platform manager (MEPM) 221 and a virtualization infrastructure manager (VIM) 222. The MEPM 221 may communicate with the MEAO 212 using a Mm3 interface and with the VIM 222 using a Mm6 interface. The VIM 222 may communicate with the NFVO 214 using a Or-Vi interface. The MEC host 230 may include a MEP 231 and a network functions virtualization infrastructure (NFVI) 232. The MEC host 230 may run mobile edge applications 233*a*, 233*b*, 233*c*. The MEP 231 may communicate with the NFVI 232 using a Mp2 interface, with the mobile edge applications 233*a*, 233*b*, 233*c* using a Mp1 interface, and with other MEPs 241*a*, 241*b* using a Mp3 interface.

Referring to FIG. 5, a WTRU 102 (e.g., 102*a*, 102*b*, 102*c*, 102*d*) hosting MEC capabilities may be connected to the MEC system 200, for example using a M×2 interface with the UALCMP 211 (e.g., network element).

Referring to FIG. 5, a WTRU 102 (e.g., 102*a*, 102*b*, 102*c*, 102*d*) hosting MEC capabilities, may host, for example any of: NFVI and VIM capabilities (which may be referred to herein as NFVI capabilities), MEP capabilities, MEPM and MEP capabilities (which may be referred to herein as MEPM capabilities), and/or MEAO, MEPM and MEP capabilities (which may be referred to herein as MEAO capabilities). A WTRU 102*a* hosting NVFI capabilities may expose (e.g., be reachable through) a Or-Vi interface. A WTRU 102*b* hosting MEP capabilities may expose (e.g., be reachable through) a Mm5 and a Mp3 interfaces. A WTRU 102*c* hosting MEPM capabilities may expose (e.g., be reachable through) a Mm3 interface with the MEPM capabilities, and/or a Mm5 interface and a Mp3 interface with the MEP capabilities. A WTRU 102*d* hosting MEAO capabilities may expose (e.g., be reachable through) a Mm1 interface with the MEAO capabilities, a Mm3 interface with the MEPM capabilities, and/or a Mm5 interface and a Mp3 interface with the MEP capabilities.

Figure 6:
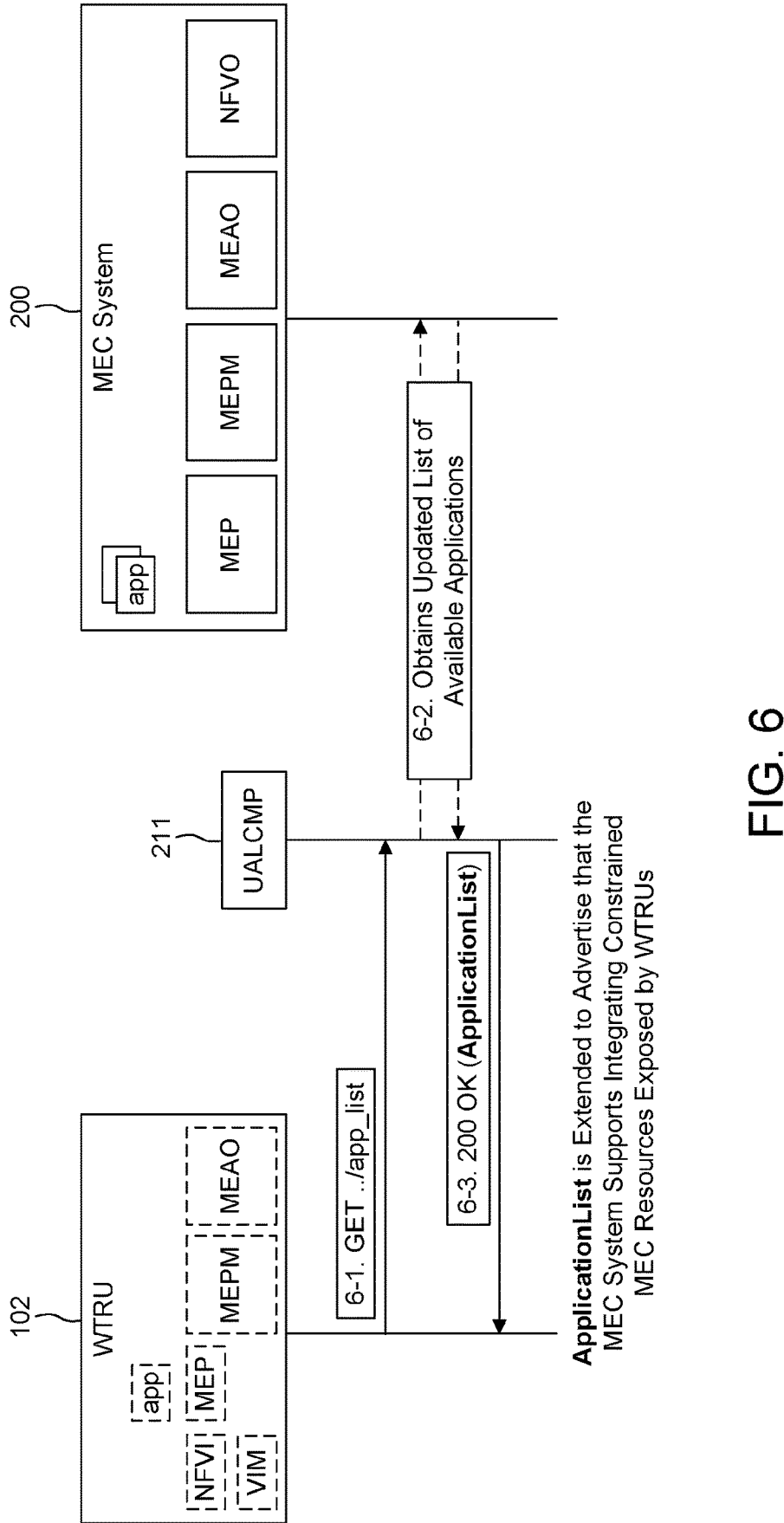
FIG. 6 is a diagram illustrating an example of a signaling exchange for an applicationlist procedure to support WTRU decision on MEC capabilities exposure.

According to embodiments, A MEC capable WTRU 102 may expose different capabilities to an existing MEC system 200 (e.g., MEC platform), depending on its own capabilities, and also on what the MEC capable WTRU 102 may decide to expose to a given MEC system 200 (e.g., MEC platform). Representative Procedure for Requesting Constrained MEC Capabilities Support From the MEC System FIG. 6 is a diagram illustrating an example of a signaling flow diagram of a procedure for requesting constrained MEC capabilities support from the MEC system 200 to support the MEC capable WTRU 102 decision on MEC capabilities exposure.

At operation 6-1, the MEC capable WTRU 102 may send a request message (which may be referred to herein as "GET") to the MEC system, for example to the UALCMP 211 network element, for requesting the list of (e.g., user, MEC) applications that may be available to the requesting MEC capable WTRU 102 (e.g., application) (which may be referred to herein as "user application look-up" procedure). The GET request may be sent over the defined (by ETSI MEC) Mx2 interface. For example, the GET request message may include an information (e.g., element) indicating that the MEC capable WTRU 102 may be interested in constrained MEC capabilities (e.g., resources) support information of the MEC system. The information (e.g., element) may be any kind of data representation capable of indicating a request for receiving constrained MEC capabilities (e.g., resources) support information of the MEC system. For example, the UALCMP 211 network element may authorize the request from the MEC capable WTRU 102.

At operation 6-2, the MEC system 200 may retrieve the list of MEC applications that may be available to the requesting MEC capable WTRU 102. For example, the UALCMP 211 may exchange signaling messages with the MEAO network element for requesting and receiving the list of MEC applications.

At operation 6-3, the MEC capable WTRU 102 may receive a message (which may be referred to herein as "200 OK response"), for example from the UALCMP 211 network element. The 200 OK response message may include, e.g., in the message body a data structure (which may be referred to herein as "ApplicationList") that may indicate the list of available user applications, MEC applications, collectively "applications". The data structure may include information about an application, such as e.g., any of an application identifier, an application name, an application provider, an application software version, an application description, application characteristics (e.g., memory, storage, latency, bandwidth, service continuity). According to embodiments, the data structure may include (e.g., additional) information about constrained MEC capabilities that may be supported for integration by the MEC system, for example, as described in Table 1.

According to embodiments, the information about constrained MEC capabilities (which may be referred to herein as "cMECSupport") may indicate a type of constrained MEC capabilities, that may be supported (e.g., provided) for integration by the MEC system.

According to embodiments, the type of constrained MEC capability (e.g., resource) may be any of: not supported (e.g., 0 value), VIM+NFVI (e.g., 1 value), MEP (e.g., 2 value), MEP+MEPM (e.g., 3 value), and MEP+MEPM+MEAO (e.g., 4 value).

Table 1 describes constrained MEC capabilities support attributes that may be included in a 200 OK response message of the procedure for requesting constrained MEC capabilities support from the MEC system. Tables 1, 2 and 3 describe the attributes in the form of a data model, specified by the ETSI MEC specifications, where the signs ">", ">>", ">>>" may indicate different levels of hierarchy in the data model. For example, ">appInfo", followed by ">>validityTime" may indicate that "validityTime" may be a sub attribute of "appInfo".

TABLE 1

| Constrained MEC capabilities support from the MEC system | | | |
|---|---|---|---|
| Attribute name | Data type | Cardinality | Description |
| appList | Array (Structure (inlined)) | 0 . . . N | List of user applications available to the device application. As defined below. |
| >appInfo | Structure (inlined) | 1 | |
| cMECSupport | Array (Enum) | 0 . . . N | Type of cMEC integration supported. Permitted values: 0 = Not supported 1 = Integration with VIM + NFVI supported 2 = Integration with MEP supported |

TABLE 1-continued

Constrained MEC capabilities support from the MEC system

| Attribute name | Data type | Cardinality | Description |
|---|---|---|---|
| | | | 3 = Integration with MEP + MEPM supported 4 = Integration with MEP + MEPM + MEAO supported NOTE: These are examples of cMEC integration schemes. Other combinations can be defined and supported. |

According to embodiments, the MEC capable WTRU 102 may receive information about constrained MEC capabilities (e.g., resources) support in the 200 OK response message, without having requested it. For example, the MEC capable WTRU 102 may send a GET request message to the UALCMP 211 network element for requesting the list of applications without including any information element for requesting (e.g., supported) constrained MEC capabilities (e.g., resources) information. For example, the UALCMP 211 network element may (e.g., decide/determine to) transmit (e.g., supported) constrained MEC capabilities (e.g., resources) information as described in Table 1, for example, based on its own logic (e.g., policies).

According to embodiments, the constrained MEC capabilities (e.g., resources) support information may be queried in a dedicated resource, instead of reusing the GET request message for requesting the list of (e.g., user, MEC) applications (e.g., "user application look-up" procedure).
Representative Procedure of WTRU Constrained MEC Capabilities Exposure to the MEC System A MEC capable WTRU 102 may decide/determine to expose a subset of all its constrained MEC capabilities to a given MEC system, depending on different policies. The policies may consider if the MEC system 200 supports integration of constrained MEC capabilities offered by the WTRU 102. The policies may also consider the list of applications that the MEC system 200 has (if the MEC capable WTRU 102 has asked before, using the GET message as explained above). A MEC capable WTRU 102 may only consider exposing certain MEC capabilities if the applications that can be instantiated in the MEC system 200 complement what the MEC capable WTRU 102 can offer (e.g., in Industrial or gaming scenarios). The policies may also consider the available battery on the WTRU. The policies may also consider if the expected connectivity time of the MEC capable WTRU 102 with current RAN, if known, as it might impact on the time current MEC platform is reachable. The policies may also consider the reliability and availability characteristics of the network that interconnects the MEC capable WTRU 102 with the MEC platform 231 of the MEC system 200. The policies may also consider the operator running the MEC system 200. The policies may also consider inter-dependencies of the applications available at the (e.g., full) capability MEC of the MEC system 200 and the ones at the reduced capability MEC of the WTRU 102.

The WTRU 102 hosting a reduced capability MEC may expose its MEC capabilities to an existing MEC system, that may allow to integrate both, for example, through the Mx2 interface.

Figure 7:
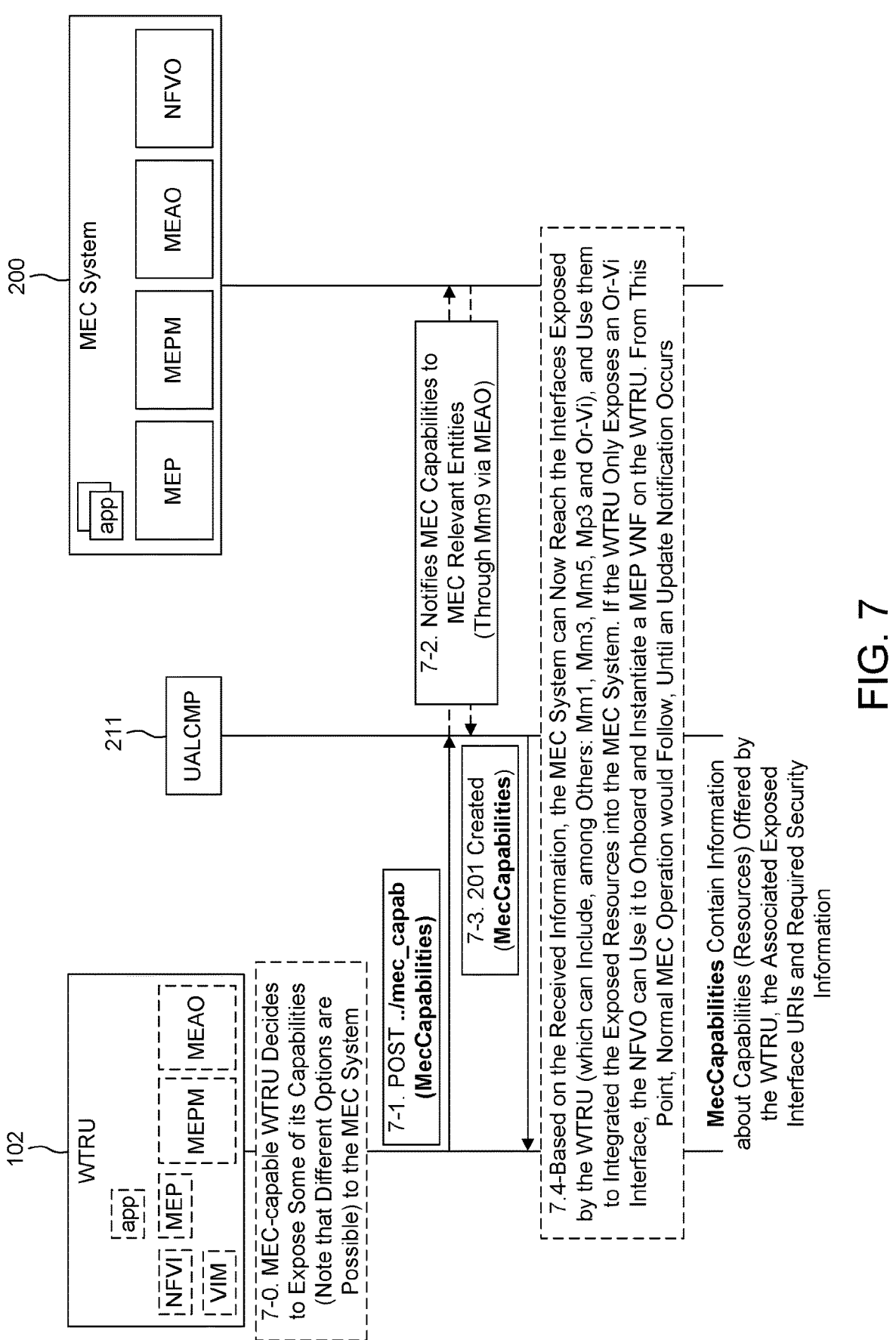
FIG. 7 is a diagram illustrating an example of a signaling exchange for a MEC capabilities exposure procedure.

FIG. 7 is a diagram illustrating an example of a signaling exchange for a MEC capabilities exposure procedure.

At operation 7-0, the MEC capable WTRU 102 may decide/determine to expose some of its capabilities to the MEC system.

At operation 7-1, the MEC capable WTRU 102 may submit (e.g., send) a request message (which may be referred to herein as "POST") to the UALCMP 211 network element for exposing part or all of its capabilities to an existing MEC system. The POST message may be sent over the defined (by ETSI MEC) Mx2 interface. The POST message may include information about the capabilities that the MEC capable WTRU 102 may decide/determine to expose (the decision part has been covered here above).

The POST message body may include a data structure (which may be referred to herein as "MecCapabilities") that may indicate the list of exposed MEC capabilities (e.g., list of WTRU (e.g., device) MEC capabilities available to the MEC system). According to embodiments, the list of exposed MEC capabilities may contain/include information about capabilities (e.g., resources) offered by the WTRU 102, the associated exposed interface URIs and/or required security information According to embodiments, the list of exposed MEC capabilities (e.g., data structure) may include (e.g., additional) information on MEC capabilities, for example, as described in Table 2. According to embodiments, information on MEC capabilities (that may be included in POST message) may include any of: a validity time attribute, a location attribute, a desired full capability MEC attribute, an identifier attribute, a name attribute, a description attribute and MEC capabilities characteristics. According to embodiments, information on MEC capabilities characteristics (that may be included in POST message) may include information on any of a type of MEC capability, an address of a Or-Vi VIM interface, an address of a Mp3 interface, an address of a Mm5 interface attribute, an address of a Mm3 interface, an address of a Mm1 interface, an advertisable attribute, a VIM characteristics and/or version, an Or-Vi interface authentication characteristics, a Mp3 interface characteristics, a Mm5 interface characteristics, a Mm3 interface characteristics, a Mm1 interface characteristics.

According to embodiments, the validity time attribute may indicate how long the list of exposed MEC capabilities is valid.

According to embodiments, the location attribute may be used by an OSS and a MEC orchestrator to select a correct MEC platform which the MEC capable WTRU 102 may connect to.

According to embodiments, if known and available at the MEC capable WTRU 102, the desired full capability MEC attribute may indicate the desired full capability MEC (e.g., the MEC system 200) the MEC capable WTRU 102 may want to connect to.

According to embodiments, the identifier attribute may indicate an identifier of the MEC capability. This attribute may be unique within the scope of the network and MEC systems involved.

According to embodiments, the name attribute may indicate a name of the MEC capability. The length of the value may not exceed 32 characters.

According to embodiments, the description attribute may indicate a human readable description of the MEC capability.

According to embodiments, the MEC capabilities characteristics may indicate characteristics of the MEC capability. The MEC capability characteristics may relate to the type of capability/resource, its uniform resource identifier (URI) and associated authentication information.

According to embodiments, the type of MEC capability (e.g., resource) may be any of VIM+NFVI (e.g., 0 value), MEP (e.g., 1 value), MEP+MEPM (e.g., 2 value), and MEP+MEPM+MEAO (e.g., 3 value).

According to embodiments, the address of a Or-Vi VIM interface may indicate an address of the Or-Vi VIM exposed interface. It may only be included in the response if the type of resource (e.g., MEC capability) is VIM+NFVI (e.g., 0 value).

According to embodiments, the address of a Mp3 interface may indicate an address of the Mp3 interface exposed by the MEP. The address may be included (e.g., only be included) in the response if the type of MEC resource is any of: MEP (e.g., 1 value), MEP+MEPM (e.g., 2 value), and/or MEP+MEPM+MEAO (e.g., 3 value).

According to embodiments, the address of a Mm5 interface may indicate an address of the Mm5 interface exposed by the MEP. The address may be included (e.g., only be included) in the response if the type of MEC resource is any of: MEP (e.g., 1 value), MEP+MEPM (e.g., 2 value), and/or MEP+MEPM+MEAO (e.g., 3 value).

According to embodiments, the address of a Mm3 interface may indicate an address of the Mm3 interface exposed by the MEPM. The address may be included (e.g., only be included) in the response if the type of MEC resource is any of: MEP+MEPM (e.g., 2 value), and/or MEP+MEPM+MEAO (e.g., 3 value).

According to embodiments, the address of a Mm1 interface may indicate an address of the Mm1 interface exposed by the MEAO. The address may be included (e.g., only be included) in the response if the type of MEC resource is MEP+MEPM+MEAO (e.g., 3 value).

According to embodiments, the advertisable attribute may indicate if the MEC capability can be advertised to other WTRUs. The advertisable attribute may have been any of: not permitted (for example value 0) and permitted (for example value 1).

According to embodiments, the VIM characteristics and/or version may indicate VIM (Or-Vi) specific information (e.g., characteristics and version of the VIM). It may be included (e.g., only be included) in the response if the type of MEC resource is VIM+NFVI (e.g., 0 value).

According to embodiments, the Or-Vi interface authentication characteristics may indicate authentication information required/used to allow access to the Or-Vi interface URI (e.g., OAuth). It may only be included in the response if the type of MEC resource is VIM+NFVI (e.g., 0 value).

According to embodiments, the Mp3 interface characteristics may indicate authentication information required/used to allow access to the Mp3 interface URI (e.g., OAuth). It may be included (e.g., only be included) in the response if the type of MEC resource is any of: MEP (e.g., 1 value), MEP+MEPM (e.g., 2 value), and/or MEP+MEPM+MEAO (e.g., 3 value).

According to embodiments, the Mm5 interface characteristics may indicate authentication information required/used to allow access to the Mm5 interface URI (e.g., OAuth). It may be included (e.g., only be included) in the response if the type of MEC resource is any of: MEP (e.g., 1 value), MEP+MEPM (e.g., 2 value), and/or MEP+MEPM+MEAO (e.g., 3 value).

According to embodiments, the Mm3 interface characteristics may indicate authentication information required/used to allow access to the Mm3 interface URI (e.g., OAuth). It may be included (e.g., only be included) in the response if the type of MEC resource is any of:

$$MEP + MEPM \text{ (e.g., 2 value), and/or}$$

$$MEP + MEPM + MEAO \text{ (e.g., 3 value).}$$

According to embodiments, the Mm1 interface characteristics may indicate authentication information required/used to allow access to the Mm1 interface URI (e.g., OAuth). It may be included (e.g., only be included) in the response if the type of MEC resource is MEPM+MEAO (e.g., 3 value).

Table 2 describes a list of WTRU (e.g., device) MEC capabilities attributes that may be included in the POST message for a MEC capabilities exposure procedure.

TABLE 2

List of WTRU MEC capabilities for MEC capabilities exposure

| Attribute name | Data type | Cardinality | Description |
|---|---|---|---|
| mecList | Array (Structure (inlined)) | 0 . . . N | List of device MEC capabilities available to the MEC system. As defined below. |
| >mecInfo | Structure (inlined) | 1 | |
| >>validityTime | String | 0 . . . 1 | Time how long this information is valid. |
| >>mecLocation | String | 0 . . . 1 | Geolocation. It can be used by OSS and MEC orchestrator to select the correct MEC platform which the MEC@WTRU can connect to. |
| >>desiredFCMec | String | 0 . . . 1 | If known and available at the WTRU, it may indicate the desired Full Capability MEC the MEC@WTRU may want to connect to. |
| >>mecCId | String | 1 | Identifier of the MEC capability. This attribute may be unique within the scope of the network and MEC systems involved. |

TABLE 2-continued

List of WTRU MEC capabilities for MEC capabilities exposure

| Attribute name | Data type | Cardinality | Description |
|---|---|---|---|
| >>mecName | String | 1 | Name of the MEC capability. The length of the value may not exceed 32 characters. |
| >>mecDescription | String | 1 | Human readable description of the MEC capability |
| >>mecCharcs | Structure (inlined) | 0 . . . 1 | Characteristics of the MEC capability. As defined below. The MEC capability characteristics relate to the type of capability/ resource, its URI and associated authentication information. |
| >>>type | Enum | 0 . . . 1 | Type of MEC capability. Permitted values: 0 = VIM + NFVI 1 = MEP 2 = MEP + MEPM 3 = MEP + MEPM + MEAO |
| >>>orviURI | URI | 0 . . . 1 | Address of the Or-Vi VIM exposed interface. It may only be included in the response if the type of resource is 0. |
| >>>mp3URI | URI | 0 . . . 1 | Address of the Mp3 interface exposed by the MEP. It may only be included in the response if the type of resource is 1, 2 or 3. |
| >>>mm5URI | URI | 0 . . . 1 | Address of the Mm5 interface exposed by the MEP. It may only be included in the response if the type of resource is 1, 2 or 3. |
| >>>mm3URI | URI | 0 . . . 1 | Address of the Mm3 interface exposed by the MEPM. It may only be included in the response if the type of resource is 2 or 3. |
| >>>mm1URI | URI | 0 . . . 1 | Address of the Mm1 interface exposed by the MEAO. It may only be included in the response if the type of resource is 3. |
| >>>orviType | Structure (inlined) | 0 . . . 1 | Extension for providing VIM (Or-Vi) specific information (e.g., characteristics and version of the VIM). It may only be included in the response if the type of resource is 0. |

TABLE 2-continued

List of WTRU MEC capabilities for MEC capabilities exposure

| Attribute name | Data type | Cardinality | Description |
|---|---|---|---|
| >>>orviAuth | Structure (inlined) | 0 . . . 1 | Extension for providing authentication information required to allow access to the Or-Vi interface URI (e.g., OAuth). It may only be included in the response if the type of resource is 0. |
| >>>mp3Auth | Structure (inlined) | 0 . . . 1 | Extension for providing authentication information required to allow access to the Mp3 interface URI (e.g., OAuth). It may only be included in the response if the type of resource is 1, 2 or 3. |
| >>>Mm5Auth | Structure (inlined) | 0 . . . 1 | Extension for providing authentication information required to allow access to the Mm5 interface URI (e.g., OAuth). It may only be included in the response if the type of resource is 1, 2 or 3. |
| >>>Mm3Auth | Structure (inlined) | 0 . . . 1 | Extension for providing authentication information required to allow access to the Mm3 interface URI (e.g., OAuth). It may only be included in the response if the type of resource is 2 or 3. |
| >>>Mm1Auth | Structure (inlined) | 0 . . . 1 | Extension for providing authentication information required to allow access to the Mm1 interface URI (e.g., OAuth). It may only be included in the response if the type of resource is 3. |
| >>>advertisable | Enum | 0 . . . 1 | Indicates if the MEC capability can be advertised to other WTRUs. Permitted values: 0 = Not permitted 1 = Permitted |

At operation 7-2, the UALCMP 211 network element, depending on the type of MEC capabilities offered by the WTRU 102, may contact the relevant entities of the MEC system, for example, through the Mm9 interface.

At operation 7-3, the MEC capable WTRU 102 may receive a response message (which may be referred to herein as "201 created"). The UALCMP 211 network element may return (e.g., send) the 201 created response message to the MEC capable WTRU 102 to indicate that a MEC capabilities context (e.g., register) may have been created. The 201 created response message 81 may have a message body that may include the data structure of the created MEC capabilities register at the MEC system 200 (e.g., list of device MEC capabilities available to the MEC system). The 201 created response message body may include information about a MEC capability, such as e.g., any of a MEC capability identifier, a validity time attribute, an address attribute created at the system.

According to embodiments, the MEC capability identifier may indicate an identifier of the MEC capability. This attribute may be unique within the scope of the network and MIC systems involved.

According to embodiments, the validity time attribute may indicate for how long the MEC capabilities exposed by the WTRU are valid. It may be equal or less than the time included by the WTRU in the previous message (e.g., POST message 81).

According to embodiments, the address attribute may indicate an address of the MEC capabilities context created at the MEC system 200. The address attribute may be used by the MEC capable WTRU 102 in case it wants to update the information about the exposed capabilities.

Table 3 describes reliability and availability attributes that may be included in the 201 created response message to the MEC capable WTRU 102 to indicate that a MEC capabilities context (e.g., register) may have been created.

TABLE 3

| created MEC capabilities register at the MEC system | | | |
|---|---|---|---|
| Attribute name | Data type | Cardinality | Description |
| mecList | Array (Structure (inlined)) | 0 . . . N | List of device MEC capabilities available to the MEC system. As defined below. |
| >mecInfo | Structure (inlined) | 1 | |
| >>mecCId | String | 1 | Identifier of the MEC capability. This attribute may be unique within the scope of the network and MEC systems involved. |
| >>validityTime | String | 0 . . . 1 | Indicates for how long the MEC capabilities exposed by the WTRU are valid. It is equal or less than the time included by the WTRU in the previous message. |
| >>referenceURI | URI | 0 . . . 1 | Address of the MEC capabilities context created at the system. |

At operation 7-4, based on the received information, the MEC system 200 may reach the interfaces exposed by the WTRU (which can include any of: Mm1, Mm3, Mm5, Mp3 and/or Or-Vi), and may use them for integrating the exposed resources into the MEC system. If the MEC capable WTRU 102 only exposes an Or-Vi interface, the NFVO may use it to onboard and may instantiate a MEP NFV on the MEC capable WTRU 102.

According to embodiments, the MEC system 200 and the MEC capable WTRU 102 may proceed to normal MEC operation between, for example until an update notification occurs.

Representative procedure of WTRU capabilities exposure update

The WTRU capabilities exposure update (e.g., procedure) may allow a WTRU 102 to update the MEC capabilities it exposes to an existing MEC system. The WTRU capabilities exposure update (e.g., procedure) may enable a WTRU 102 hosting a reduced capability MEC to update what it exposes to the (e.g., full) capability MEC system 200, for example via the Mx2 interface.

Figure 8:
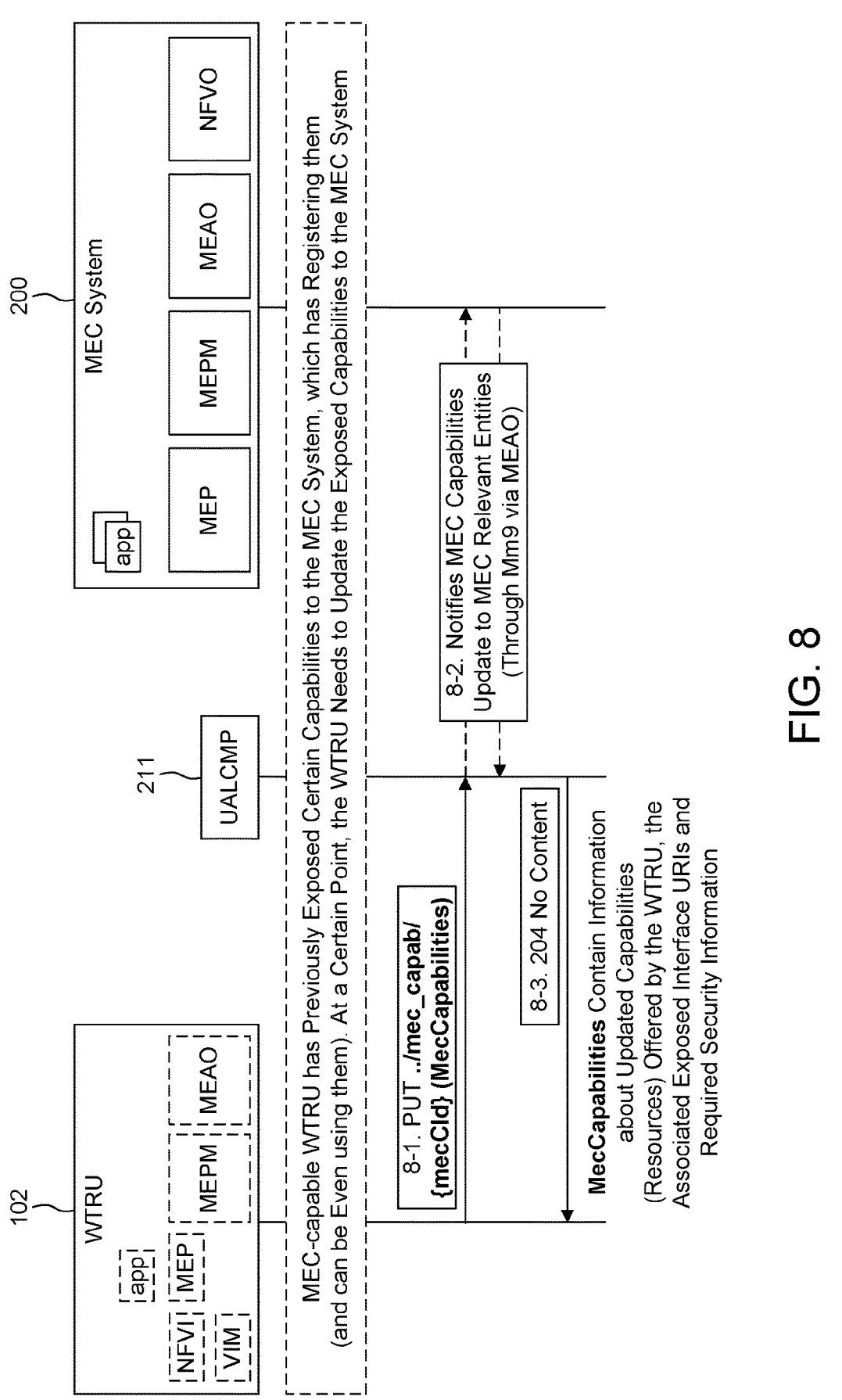
FIG. 8 is a diagram illustrating an example of a signaling exchange for a WTRU capabilities exposure update procedure.

FIG. 8 is a diagram illustrating an example of a signaling exchange for a WTRU 102 capabilities exposure update.

According to embodiments, the MEC capable WTRU 102 exposed certain MEC capabilities to the MEC system 200, which has registering them (and can be even using them). The MEC capable WTRU 102 may change the MEC capabilities currently exposed (e.g., registered) to the MEC system, for example because the available resources have changed, or/and for example because a policy decision has triggered to change what is offered to the MEC system 200.

At operation 8-1, the MEC capable WTRU 102 may update a specific MEC capabilities, context created by the MEC system 200, by sending a request message (which may be referred to herein as "PUT") to the resource within the MEC system 200 that represents it, with a message body, containing the modified data structure of the data structure that may indicate the list of exposed MEC capabilities (e.g., "MecCapabilities"), to update the offered resources. The MecCapabilities may contain/include information about updated capabilities (e.g., resources) offered by the MEC capable WTRU 102, the associated exposed interface URIs and required/used security information. The request message may use/include an Identifier of a MEC capability (e.g., mecCId) to update.

At operation 8-2, the UALCMP 211, depending on the type of MEC capabilities exposed (e.g., offered) by the MEC capable WTRU 102, may contact the relevant entities of the MEC system 200, for example through the Mm9 interface via the MEAO, to convey the updates on the MEC capabilities exposed by the MEC capable WTRU 102.

At operation 8-3, the MEC capable WTRU 102 may receive a response message (which may be referred to herein as "204 no content"), for example, to indicate that the MEC capabilities exposed may have been (e.g., successfully) updated.

Representative Procedure of WTRU Capabilities Exposure Removal

The WTRU capabilities exposure update (e.g., procedure) may allow a WTRU 102 to remove the MEC capabilities it exposes to an existing MEC system. The WTRU capabilities exposure removal (e.g., procedure) may enable a WTRU 102 hosting a reduced capability MEC to remove what it exposes to the (e.g., full) capability MEC system 200, for example via the Mx2 interface.

Figure 9:
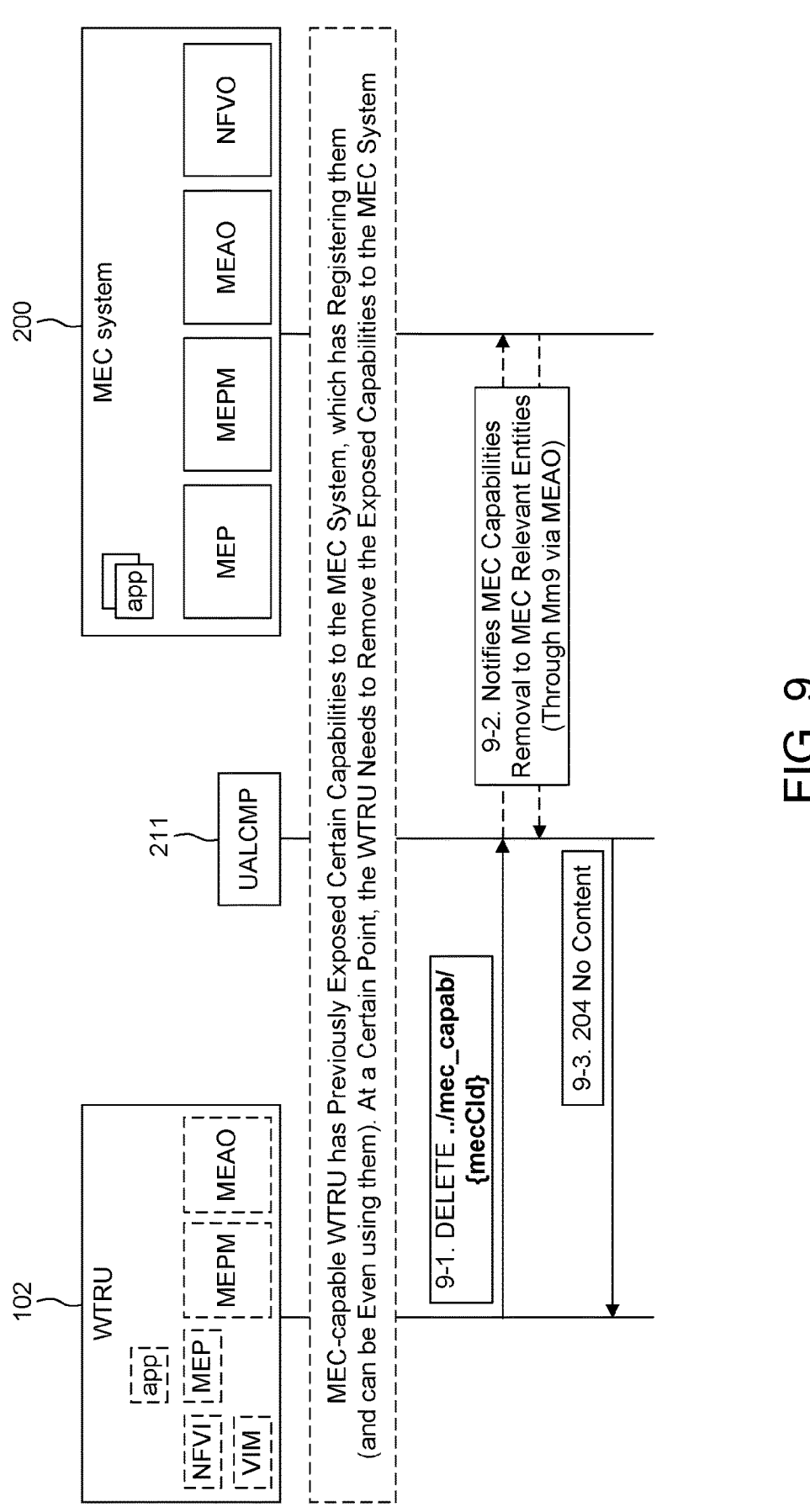
FIG. 9 is a diagram illustrating an example of a signaling exchange for a WTRU capabilities exposure removal procedure.

FIG. 9 is a diagram illustrating an example of a signaling exchange for a WTRU 102 capabilities exposure update.

According to embodiments, the MEC capable WTRU 102 exposed certain MEC capabilities to the MEC system 200, which has registering them (and can be even using them). The MEC capable WTRU 102 may change the MEC capabilities currently exposed (e.g., registered) to the MEC system, for example because the available resources have changed, or/and for example because a policy decision has triggered to change what is offered to the MEC system 200.

At operation 9-1, the MEC capable WTRU 102 may remove a specific MEC capabilities, context created by the MEC system 200, by sending a request message (which may be referred to herein as "DELETE") to the resource within the MEC system 200 that represents it. The request message may use/include an Identifier of a MEC capability (e.g., mecCId) to remove.

At operation 9-2, the UALCMP 211, depending on the type of MEC capabilities exposed (e.g., offered) by the MEC capable WTRU 102, may contact the relevant entities of the MEC system 200, for example through the Mm9 interface via the MEAO, to convey the removal on the MEC capabilities exposed by the MEC capable WTRU 102.

At operation 9-3, the MEC capable WTRU 102 may receive a response message (which may be referred to herein as "204 no content"), for example, to indicate that the MEC capabilities exposed may have been (e.g., successfully) removed.

FIG. 10 is a diagram illustrating an example of a method 1000, implemented by a WTRU 102, for integrating at least one (e.g., limited/reduced/constrained) MEC resource of the WTRU 102 in a MEC system 200.

According to embodiments, in a step 1010, a WTRU 102 may be configured to transmit, from the WTRU 102 to a MEC system 200, a request message indicating a request for information of at least one type of (e.g., limited/reduced/constrained) MEC resource supported by the MEC system 200.

According to embodiments, in a step 1020, the WTRU 102 may be configured to receive by the WTRU 102 from the MEC system 200, a response to the request message indicating at least one supported type of limited MEC resource by the MEC system 200.

According to embodiments, in a step 1030, the WTRU 102 may be configured to determine, by the WTRU 102, based on the supported type of (e.g., limited/reduced/constrained multi-access edge computing) MEC resource, at least one (e.g., limited/reduced/constrained multi-access edge computing) MEC resource of the WTRU 102 that is available for integration by the MEC system 200.

According to embodiments, in a step 1040, the WTRU 102 may be configured to transmit by the WTRU 102 to the MEC system 200, a further message indicating the at least one determined (e.g., limited/reduced/constrained multi-access edge computing) MEC resource of the WTRU 102 to be integrated by the MEC system 200.

According to embodiments, in a step 1050, the WTRU 102 may be configured to receive by the WTRU 102 from the MEC system 200, a response to the further message indicating an integration by the MEC system 200 of the determined at least one (e.g., limited/reduced/constrained multi-access edge computing) MEC resource of the WTRU 102.

For example, the WTRU 102 may be further configured to instantiate an application of the MEC system 200 in the at least one (e.g., limited/reduced/constrained multi-access edge computing) MEC resource of the WTRU 102.

For example, the WTRU 102 may be further configured to integrate the at least one (e.g., limited/reduced/constrained multi-access edge computing) MEC resource of the WTRU 102 with the MEC system 200.

For example, the type of (e.g., limited/reduced/constrained multi-access edge computing) MEC resource supported by the MEC system 200 may comprise any of a VIM associated with a NFVI, a MEP, a MEP associated with a MEPM, and a MEP associated with a MEPM and/or a MEAO.

For example, the request message may indicate a request for a list of applications available to the WTRU 102 in the MEC system 200, and/or the response to the request message may indicate the list of available applications.

For example, the WTRU 102 may be further configured to transmit, from the WTRU 102 to the MEC system 200, another message for updating a characteristic of at least one (e.g., limited/reduced/constrained multi-access edge computing) MEC resource of the WTRU 102 integrated by the MEC system 200.

For example, the WTRU 102 may be further configured to transmit, from the WTRU 102 to the MEC system 200 a message requesting removal of the integration of at least one (e.g., limited/reduced/constrained multi-access edge computing) MEC resource of the WTRU 102 integrated by the MEC system 200.

For example, the further message includes any of: an identifier attribute, a validity time attribute and/or a context attribute of at least one (e.g., limited/reduced/constrained multi-access edge computing) MEC resource of the WTRU 102 integrated by the MEC system 200.

FIG. 11 is a diagram illustrating an example of a method 1100, implemented by a MEC system 200, for integrating at least one (e.g., limited/reduced/constrained multi-access edge computing) MEC resource of a WTRU 102 in the MEC system 200.

According to embodiments, in a step 1110, a MEC system 200 may be configured to receive by the MEC system 200 from a WTRU 102 comprising at least one (e.g., limited/reduced/constrained) MEC resource, a request message indicating a request for information of at least one type of (e.g., limited/reduced/constrained multi-access edge computing) MEC resource, supported by the MEC system 200.

According to embodiments, in a step 1120, the MEC system 200 may be configured to determine, by the MEC system 200, at least one type of (e.g., limited/reduced/constrained) MEC resource supported by the MEC system 200.

According to embodiments, in a step 1130, the MEC system 200 may be configured to transmit, from the MEC system 200 to the WTRU 102, a response to the request message indicating the at least one supported type of (e.g., limited/reduced/constrained multi-access edge computing) MEC resource.

According to embodiments, in a step 1140, the MEC system 200 may be configured to receive, by the MEC system 200 from the WTRU 102, a further message indicating at least one (e.g., limited/reduced/constrained multi-access edge computing) MEC resource of the WTRU 102 to be integrated by the MEC system 200, determined by the WTRU 102 based on the supported type of (e.g., limited/reduced/constrained multi-access edge computing) MEC resource.

According to embodiments, in a step 1150, the MEC system 200 may be configured to integrate the at least one (e.g., limited/reduced/constrained multi-access edge computing) MEC resource of the WTRU 102.

According to embodiments, in a step 1160, the MEC system 200 may be configured to transmit, from the MEC system 200 to the WTRU 102, a response to the further message indicating at least one (e.g., limited/reduced/constrained multi-access edge computing) MEC resource of the WTRU 102 integrated by the MEC system 200.

For example, the MEC system 200 may be further configured to instantiate an application of the MEC system 200 in the at least one (e.g., limited/reduced/constrained multi-access edge computing) MEC resource of the WTRU 102.

For example, the type of (e.g., limited/reduced/constrained multi-access edge computing) MEC resource supported by the MEC system 200 may comprise any of a VIM associated with a (NFVI, a MEP, a MEP associated with a MEPM, and a MEP associated with a MEPM and/or a MEAO.

For example, the request message may indicate a request for a list of applications available to the WTRU 102 in the MEC system 200, and/or the response to the request message may indicate the list of available applications.

For example, the MEC system 200 may be further configured to receive, from the WTRU 102, another message for updating a characteristic of at least one (e.g., limited/reduced/constrained multi-access edge computing) MEC resource of the WTRU 102 integrated by the MEC system 200, and/or the MEC system 200 may be further configured to update the characteristic of the at least one (e.g., limited/reduced/constrained multi-access edge computing) MEC resource of the WTRU 102 integrated by the MEC system 200.

For example, the MEC system 200 may be further configured to receive, from the WTRU 102, a message requesting removal of at least one (e.g., limited/reduced/constrained multi-access edge computing) MEC resource of the WTRU 102 integrated by the MEC system 200, and/or the MEC system 200 may be further configured to remove the at least one (e.g., limited/reduced/constrained multi-access edge computing) MEC resource of the WTRU 102 integrated by the MEC system 200.

For example, the further message includes any of: an identifier attribute, a validity time attribute and/or a context attribute of at least one (e.g., limited/reduced/constrained multi-access edge computing) MEC resource of the WTRU 102 integrated by the MEC system.

MEC in Constrained Devices

Figure 12:
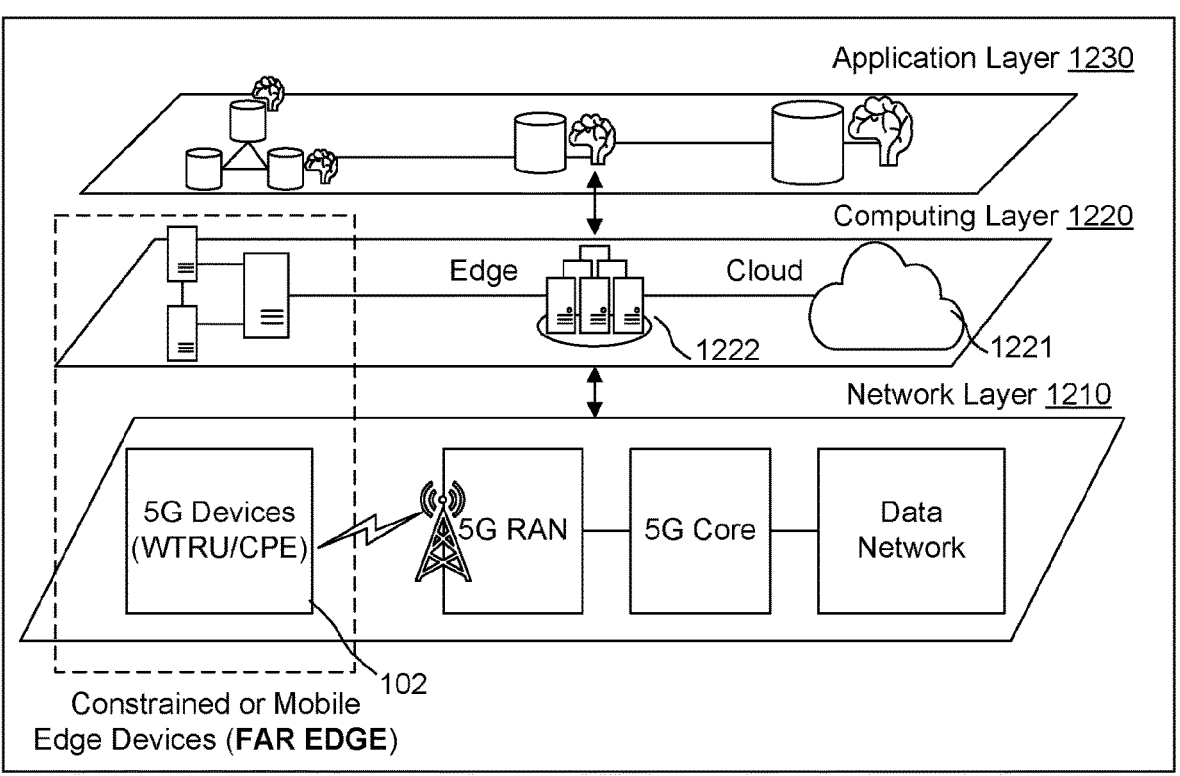
FIG. 12 is a diagram illustrating a high level framework for use cases of MEC, according to embodiments.

FIG. 12 is a diagram illustrating a high level framework for use cases of MEC, according to embodiments.

In a case of (e.g., conventional, state of the art, etc.) ETSI MEC, ETSI MEC ISG provides (e.g., see ETSI MEC 036, "Multi-access Edge Computing (MEC); Study on MEC in resource constrained terminals, fixed or mobile", October 2020) analyses of (e.g., possible) application of ETSI MEC technologies in devices such as any of terminal units, mobile hosts, and personal devices, for example, for supporting cloud computing at the edge. In such a case, there is a focus on (e.g., different) aspects of such devices. For example, there may be aspects associated with limited (e.g., computational, battery, etc.) capacity available to run MEC applications, and implications of such limited capacity has on lifecycles of the virtual instances. Further, there may be aspects associated with volatility of computing resources, including aspects such as the mobility of the terminals hosting the MEC infrastructure, and aspects (e.g., the problems) regarding the reliability of the connectivity between a constrained device (e.g., a reduced capacity device) and (e.g., network) infrastructure. Aspects may also be associated with security and authorization specific functions and the impact of such functions on the privacy of user data.

Referring to FIG. 12, an (e.g., overall) framework for use cases (e.g., as considered by ETSI MEC) may have (e.g., include, consist of, etc.) (e.g., three) logical layers, for example, including a network layer 1210, a computing layer 1220, and an application layer 1230.

For example, the network layer may be (e.g., is depicted as, may use) an end-to-end 5G network. Referring to FIG. 12, the computing layer 1220 may be composed of (e.g., different) computing tiers, such as, for example, a central cloud 1221, an edge cloud 1222 (e.g., a telco edge) connected to any of network edge capabilities and far edge capabilities, for example, associated with constrained devices (e.g., WTRU 102) (e.g., terminals, WTRUs, reduced capacity WTRUs, Customer Premises Equipment (CPEs), etc.). Far edge capabilities may be embedded (e.g., preconfigured, pre-provisioned, etc.) in the constrained devices (e.g., WTRUs 102), and/or may dynamically provisioned. Constrained devices (e.g., WTRUs 102) may be battery-powered, mobile, volatile, devices, for example, with limited compute (e.g., capabilities) and/or connectivity, for example, as compared to the traditional edge clouds. The constrained devices (e.g., WTRUs 102) may collaborate and exchange information among themselves. Referring to FIG. 12, the application layer 1230, which may provide functionalities such as telemetry, training and inference, is distributed across different computing tiers, including far edge constrained devices (e.g., WTRUs 102). Applications and functions may be hosted anywhere in the computing stratum, such as at a cloud, at edge devices, and/or at far edge devices.

In a case of (e.g., conventional, state of the art, etc.) ETSI MEC, for constrained devices (e.g., WTRUs 102), there are use cases that may include (e.g., benefit from) MEC technology. For example, there may be a use case of constrained devices (e.g., WTRUs 102) for federated learning. In such a case, federated learning (FL) is a distributed learning technique, wherein privacy sensitive training data is generated and processed (e.g., possibly unevenly) across learning agents, for example, instead of being transported and processed in a centralized edge cloud or distant cloud. Such a case of FL allows each agent (e.g., deployed on a far edge constrained device) to compute a set of local learning parameters from the available training data, and such may be referred to as a local model. Further, in such a case of FL, instead of sharing the training data, agents share their local models with a central entity (e.g., an edge cloud 1222). The central entity (e.g., in turn) does model averaging and (e.g., then) shares a global model with the agents (e.g., on the far edge constrained devices). As such, a case of FL does not need (e.g., require) exchanging of training data, and for example, reduces communication latencies, and for example, provides a solution able to work with sensitive data at the end device, since these data will not be exchanged with other entities.

Another use case may be a smart factory use case. In such a smart factory use case, machines and/or devices in a smart factory (e.g., are assumed to) have capabilities for networking, computing, and storage. Such computing capability on local machines and/or devices in the smart factory may locally support distributed data telemetry and/or locally support intelligent functionalities. For example, in such a case, numerous cameras and sensors, with (e.g., possibly) some cameras and/or sensors being mobile (e.g., drone based, on-wheels, carried by guided vehicles, etc.), are continuously monitoring a production line of the smart factory. In such a case, the cameras and sensors are capable of any of data storage and fast data analysis, including extracting and capitalizing on the corresponding knowledge in real-time.

In such smart factory case, running FL in a case of (e.g., coupled with) advancements in Deep Learning (DL) across multiple participating end devices, there may be (e.g., opening of possibilities for) optimization of manufacturing processes in smart factory. For example, in such a smart factory use case, smart manufacturing process demands real-time inference of the data collected, for example, to prevent delays, avoid mistakes and improve efficiency. In such a case, to provide factory managers with the ability to quickly parse real-time data, make better informed decisions, and recognize potential defects in production, a distributed localized edge computing solution is leveraged. Further, there may be a use case of multiplayer AR/VR multimodal mobile gaming. In a conventional case of cloud gaming, games played via/using such (e.g., conventional) cloud gaming may (e.g., cannot) achieve the graphic quality of locally computed counterparts in dedicated hardware. Further, in such a case of cloud gaming, the addition of AR/VR may need (e.g., require) local computation, for example, to overcome the latency limitations of current architectures. Such (e.g., extra, additional, etc.) local computation may be provided by a local MEC in a constrained device (e.g., WTRUs 102).

As discussed above, there is a case of (e.g., conventional, state of the art, etc.) ETSI MEC for (e.g., resource) constrained devices (e.g., WTRUs 102), which may be herein referred to interchangeably as any of reduced/limited capabilities MEC or cMEC, and which may be located in a local network, and/or ETSI MEC for associated use cases. A cMEC, which may be a WTRU 102 and/or included in a WTRU 102, which may be a local cMEC, may have any of a variety of capabilities, architectures and available services. A WTRU 102 may use any of the capabilities, architectures and available services for local consumption and may operate in close collaboration with full capability MEC platforms located deep in the infrastructure (edge-MEC or eMVIEC). As referred to herein, any of an edge-MEC and an eMEC may be interchangeably referred to as an eMEC system or a MEC system 200. In the above discussed cases and/or uses cases, the applicability of (e.g., conventional, state of the art, current, etc.) ETSI MEC specifications is subject of analysis.

According to embodiments, for example, in order to provide MEC technology in a 5G/3GPP system, there may be a need for any of the below discussed features, nodes, interfaces, entities, elements, attributes, characteristics, configurations, methods, procedures, operations, etc. For example, any of such embodiments may be associated with, directed to, addressing, applied to, and/or for (e.g., gaps of) the above discussed cases of (e.g., conventional, state of the art, etc.) ETSI MEC for (e.g., resource) constrained devices and/or associated use cases. According to embodiments, a WTRU may use (e.g., already) established communication with the eMEC, for example, to register and make available resources at a local cMEC. According to embodiments, different natures of resources and/or different characteristics of the cMEC may be informed to an eMEC. According to embodiments, a WTRU 102 may influence a decision of a MEC orchestrator, for example, to indicate the preferred location of an application in the local cMEC. For example, according to embodiments, a WTRU 102 may (e.g., also) inform the eMEC regarding capabilities of the cMEC.

Architecture and Scenarios for MEC Applications

In a case of (e.g., according to a concept of) constrained MEC, there may be (e.g., assumption of, a possibility of) running (e.g., ETSI) MEC applications and/or MEC services on a node (e.g., local network node or cMEC node) having and/or associated with limitations on/for any of computation and/or communication, such as limitations on/for a CPU, memory, storage, or networking. In such a case, characteristics of such devices may have a (e.g., impose a different and/or new) set of limitations not (e.g., previously) considered in/by ETSI MEC, such as, for example, volatility or lack of resources to execute a certain application.

According to embodiments, an architecture for a case of constrained MEC may be represented by (e.g., defined according to) a set of blocks for showing (e.g., defining) a connection architecture that may be used for interconnecting reduced capabilities (red-cap) MEC devices, which may also be referred as a constrained MEC (cMEC) devices, with legacy MEC platforms, which may be (e.g., typically) at a location (e.g., deep) in a network that may be referred to as Edge-MEC (eMEC). According to embodiments, such eMEC may be at a deep network location of the infrastructure of an operator network and/or service providers' network. In the ETSI MEC reference architecture, eMEC is generally the MEC system 200, unless noted as a specific entity (MEC orchestrator (MEO), MEP, etc.).

Figure 13:
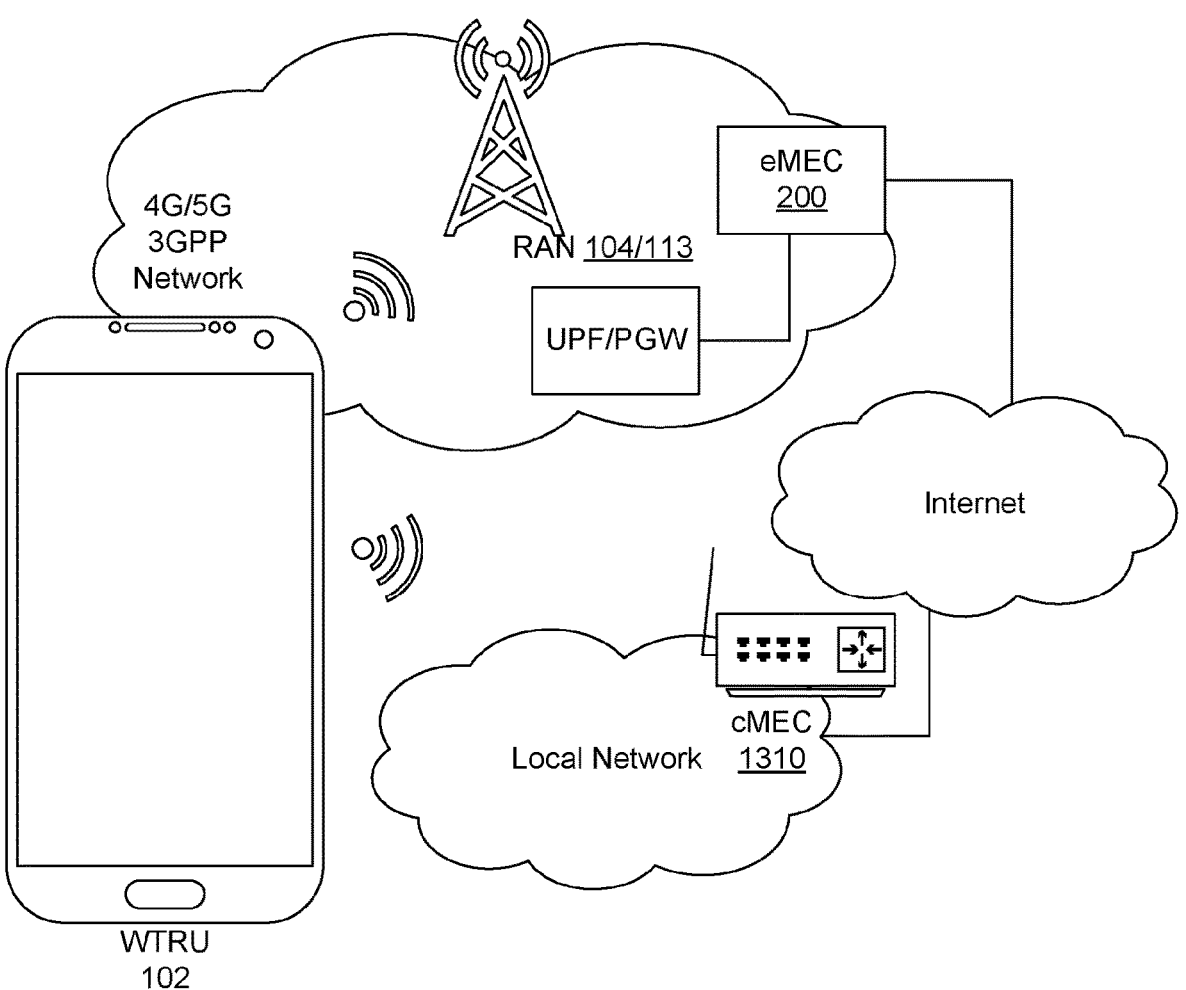
FIG. 13 is a diagram illustrating a constrained MEC (cMEC) deployment, according to embodiments.

FIG. 13 is a diagram illustrating a cMEC deployment, according to embodiments.

According to embodiments, for example, referring to FIG. 13 and/or as discussed below, a (e.g., focus of a) deployment of cMEC 1310 and eMEC 200 may be a hierarchical system. According to embodiments, such (e.g., an assumption of) a hierarchical system may not (e.g., does not) does not impose any constraint on a relation (e.g., the relationship) between the domains that the eMEC 200 and the cMEC 1310 (e.g., respectively) belong to. According to embodiments, there may be a case (e.g., some cases) in which (e.g., it is considered that) the eMEC administrative domain is extended to include the cMEC 1310. According to embodiments, there may be a case (e.g., some other cases) in which (e.g., it is considered that) the interaction is between the eMEC 200 acting as a provider-domain, while the cMEC 1310 acts as a user-domain.

According to embodiments, for example, referring to a (e.g., possible) cMEC 1310 deployment scenario shown in FIG. 13, there may be a case (e.g., use case) of mobile gaming having a WTRU 102 connected to an eMEC 200 provided by any of a mobile network operator (e.g., a telco, a RAN 104/113) and a Hyperscaler (e.g., AWS, Azure, etc.), for example, through (e.g., via, using, over, etc.) a wireless (e.g., 5G) network operator. In such a case, according to embodiments, the WTRU may (e.g., also) be connected to a (e.g., another) local network, for example, through/via a WLAN having a local cMEC 1310 that is available. The present disclosure, and embodiments discussed herein below, are not limited to the access technologies (i.e., 5G and WLAN) of FIG. 13, and the embodiments and/or disclosure discussed herein may be applied to any suitable and/or similar access technologies, wireless technology, communication/networking technology, etc., (e.g., 4G, WLAN, Ethernet, etc.).

According to embodiments, there may be a case of (e.g., it may be assumed that) a WTRU 102 may (e.g., be able to) discover a local cMEC 1310, for example, using mechanisms not discussed herein. According to embodiments, there may be a case of (e.g., it may be assumed that) a WTRU 102 may be authorized to use a local cMEC 1310, for example, via/using authentication granted or obtained via mechanisms not discussed herein. According to embodiments, there may be a case of (e.g., it may be assumed that) a WTRU 102 may (e.g., be able to) discover the (e.g., different) mechanisms used to integrate the local cMEC 1310 in the eMEC 200, and the WTRU 102 may obtain the authorization keys required to do that, for example, via/using authentication granted or obtained via mechanisms, such as, for example, authentication mechanisms/operations not discussed herein. According to embodiments, there may be a case of (e.g., it may be assumed that) a WTRU 102 may (e.g., be able to) locate and/or discover a UALCMP 211 of eMEC 200 over the Mx2 interface, for example, via/using authentication granted or obtained via mechanisms not discussed herein.

Message Exchange for MEC

Figure 14:
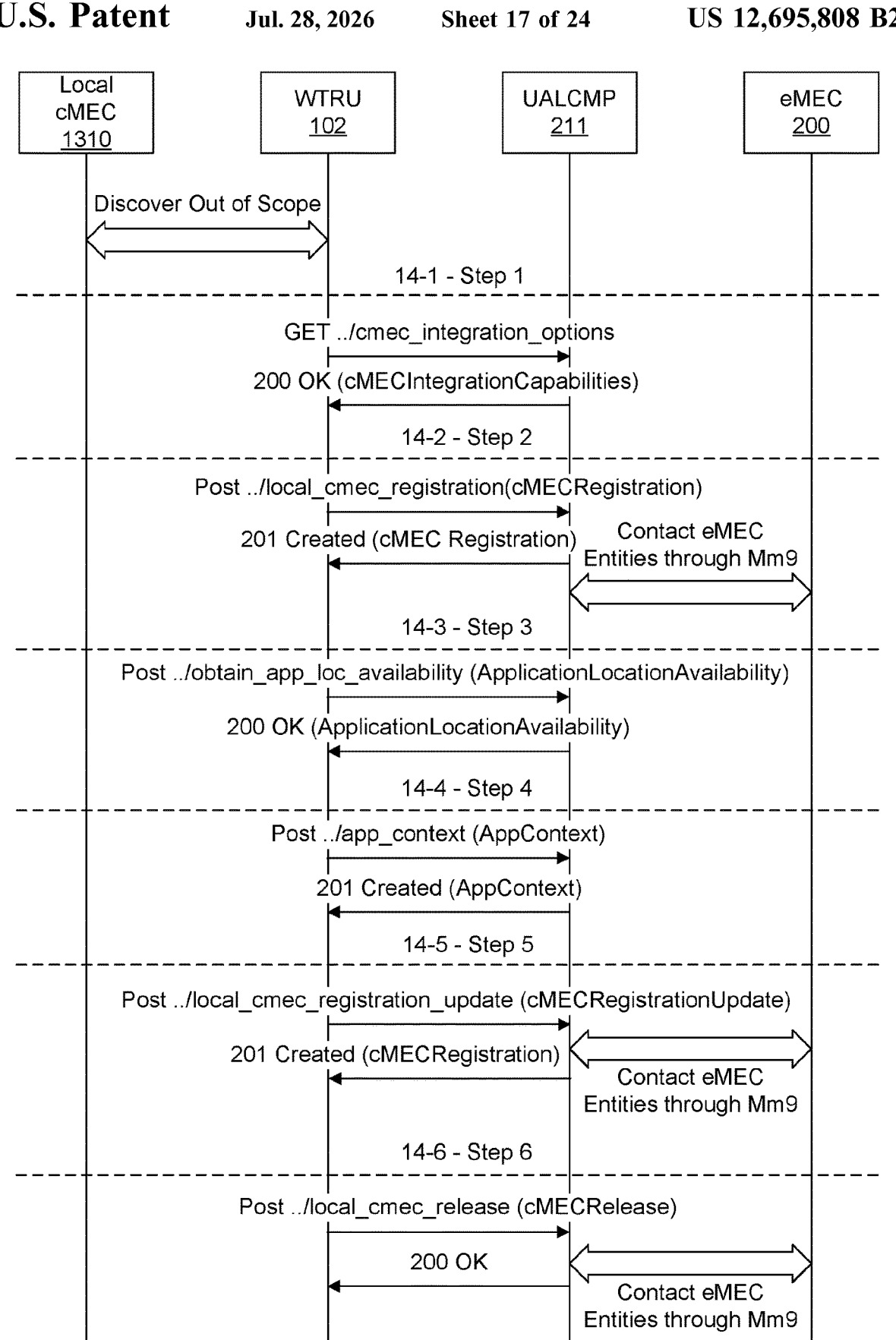
FIG. 14 is a diagram illustrating an information flow, according to embodiments.

FIG. 14 is a diagram illustrating an information flow, according to embodiments.

provided by the WTRU 102 and that are regarding the local cMEC 1310 in the request message. According to embodiments, a data type (e.g., an information element, a message, information, a signal, etc.) associated with (e.g., for, representing, specifying, etc.) the cMECIntegrationCapabilities may be as shown in Table 4.

TABLE 4

| cMECIntegration Capabilities Data Type | | | |
|---|---|---|---|
| Attribute name | Data type | Cardinality | Description |
| >ueId | String | 1 | Identifier of the WTRU. This attribute shall be globally unique. This attribute can take the form of an MMEC or M-TMSI as defined in ETSI TS 136 413, or a 3GPP IMSI or GPSI, an IEEE 802 MAC Address, an IEEE 802.11 Association ID or any other example of identifier from a terminal. |
| >cMECSupport | Enum | 0 . . . N | Type of cMEC integration requested/supported. Permitted values: 0 = Not supported 1 = Integration with VIM + NFVI supported 2 = Integration with MEP supported 3 = Integration with MEP + MEPM supported 4 = Integration with MEP + MEPM + MEAO supported 5 = Integration with cMEC outside the WTRU supported This attribute is optional in the cmec_integration_options request and must be filled in the response. |

Referring to FIG. 14, an information flow may be for (e.g., may represent) any of a message exchange, a signaling flow, a RF transmission and/or reception, etc. According to embodiments, as a first operation, for example of the information flow of FIG. 14, a WTRU 102 may (e.g., need to, be required to, etc.) get (e.g., retrieve, receive, request, determine, etc.) information associated with (e.g., indicating, about, etc.) cMEC integration features, for example, of the eMEC 200. According to embodiments, a WTRU 102 may get such information via (e.g., a variety of) mechanisms, such as, for example, via any of (e.g., a definition of, i.e., new) messages and/or information elements, for example, carried over a Mx2 interface between a WTRU 102 and a UALCMP 211.

According to embodiments, such (e.g., newly defined) information (e.g., signaling, message, information element, data type, etc.) associated with cMEC integration features may be referred to (e.g., herein) as ../cmec_integration_options. According to embodiments, such information associated with cMEC features may (e.g., optionally, also, further, etc.) include (e.g., information indicating, a list of, etc.) a cMECIntegrationCapabilities, for example, to indicate integration options supported by a (e.g., local) cMEC. According to embodiments, (e.g., different) integration options, for example, supported by an eMEC 200, may be indicated via a cMECIntegrationCapabilities, for example, provided (e.g., sent, transmitted, etc.) in response to cMECIntegrationCapabilities indicating integration options supported by the local cMEC 1310.

That is, according to embodiments, there may be a response including (e.g., information indicating) a cMECIntegrationCapabilities for indicating (e.g., the different) integration options supported by the eMEC 200. According to embodiments, such information may be associated with a list of integration options that is influenced by (e.g., associated with) any of (e.g., a list of) integration options that are According to embodiments, for example as a further aspect of the first operation 14-1 of FIG. 14, a WTRU 102 may determine (e.g., decide) to expose a local cMEC 1310, for example, that the WTRU 102 has access to on its local LAN, according to policies. That is, according to embodiments, after the WTRU 102 confirms (e.g., gets, obtains, receives, etc.) the cMEC integration capabilities of the eMEC 200, the WTRU 102 may decide to expose a local cMEC 1310 that the WTRU 102 has access via a local LAN, for example, depending on different policies.

According to embodiments, such policies, among a variety of similar and/or suitable policies, may be (e.g., associated with) any of: application specific requirements; latency to the local cMEC; computing capabilities of the local cMEC 1310; (e.g., network and storage) resource availability of the local cMEC 1310; power (e.g., battery) status of the local cMEC 1310; and hardware acceleration available at the local cMEC 1310.

According to embodiments, as a second operation 14-2, for example referring to FIG. 14, a WTRU 102 may (e.g., determine to, decide to, etc.) expose characteristics of a (e.g., local) cMEC 1310 to an eMEC 200. For example, according to embodiments, a WTRU 102 may send a (e.g., new) message, (e.g., signal, command, information element, information indicating, etc.) POST ../local_cmec_registration, for example, over a (e.g., as defined by ETSI MEC) Mx2 interface.

According to embodiments, the (e.g., new) message, POST ../local_cmec_registration may contain (e.g., indicate) information for (e.g., used by, needed by, etc.) the eMEC 200 to integrate the cMEC 1310. That is, according to embodiments, a WTRU 102 may send a (e.g., new) message, POST ../local_cmec_registration for registration with an eMEC. According to embodiments, a data type (e.g., an information element, a message, information, a signal, etc.) associated with (e.g., for, representing, specifying, etc.) cMEC registration may be as shown in Table 5.

TABLE 5

| cMECRegistration Data Type | | | |
|---|---|---|---|
| Attribute name | Data type | Cardinality | Description |
| cMECRegistration | Structure (inlined) | 0 . . . N | List of MEC characteristics and connection options. |
| >location | LocationConstraints | 1 | Extended LocationConstraints data type indicating the location of the local cMEC, as defined in 6 |
| >cMECId | String | 1 | Identifier of the cMEC. This attribute may be globally unique. |
| >type | Enum | 1 | Type of MEC capability. Permitted values: 0 = VIM + NFVI 1 = MEP 2 = MEP + MEPM 3 = MEP + MEPM + MEAO The request message may provide the full list of options available at the local cMEC. The response may include only the integration type selected. |
| >interfaces | IntegrationInterface | 0 . . . N | List of interfaces that may be used to integrate the local cMEC. The request may include all possible interfaces according to the type field. The response may include only the used interface. |
| >cMECfeat | CMECFeatures | 0 . . . 1 | Structure defining the features available in the cMEC Not required in the response. |
| >advertisable | Enum | 0 . . . 1 | Indicates if the local cMEC presence can be advertised to other WTRUs. Permitted values: 0 = Not permitted 1 = Permitted Not required in the response |
| >validityTime | Integer | 0 . . . 1 | Indicates how long the registration is valid. |
| >referenceURI | URI | 0 . . . 1 | Address of the cMEC instance. It may be included only in the response. |

According to embodiments, any of an integration interface and CMEC features (e.g., applicable to FIG. 14) are discussed (e.g., defined) as discussed below with regard to referenced structures. According to embodiments, for example as part of the second operation 14-2, a UALCMP 211 may contact (e.g., relevant) entities of the MEC system 200, for example, via (e.g., using, through, over, etc.) a Mm9 interface. For example, according to embodiments, according to (e.g., depending on) a type of MEC integration offered by a (e.g., local) cMEC 1310 and supported by the eMEC 200, the UALCMP 211 contacts the relevant entities of the MEC system 200 through the Mm9 interface. According to embodiments, for example as part of the second operation 14-2, a UALCMP 211 may send (e.g., may return) to the WTRU 102, a UALCMP 211 returns the 201 Created response, including (e.g., in a message body) a cMECRegistration data structure including information associated with registration and/or indicating how the cMEC 1310 is registered at the eMEC system 200.

According to embodiments, a referenceURI included in a cMECRegistration data structure may be used by a WTRU 102 to update the registration. According to embodiments, a reference URI associated with (e.g., within the) integration interface may be used by a WTRU 102 in a case where the WTRU 102 updates (e.g., desires to, decides to, wants to, etc., update) the information about a (e.g., certain) interface of the registration. According to embodiments, for example as part of the second operation, a WTRU 102 may request a list of (e.g., available) applications, for example, in a case where it has not been done before (e.g., performing the above features of the second operation).

According to embodiments, as a third operation 14-3, for example referring to FIG. 14, a WTRU 102 may request (e.g., send a request for) a list of (e.g., possible) locations for instantiation of a MEC applications (e.g., locations in/at eMEC 200 and/or cMEC nodes, in a local area). For example, according to embodiments, in a case where a WTRU 102 has received an acknowledgement of the cMEC 1310 successfully joining the eMEC 200, then the WTRU 102 may request the list of possible locations within the edge system for where the MEC application may be instantiated, such as the locations in any of eMEC nodes or cMEC nodes in a local area. According to embodiments, such request may be done (e.g., may include, may be sent as, may have a form of, etc.) using/via an ApplicationLocationAvailability structure, for example, that is included in (e.g., used within) the obtain_app_oc_availability Mx2 call. According to embodiments, a structure ApplicationLocationAvailability may include (e.g., may be extended to carry) a set of IDs for a (e.g., local) cMEC, for example, by extending the LocationConstraints structure. According to embodiments, a LocationConstraints. Structure/data type may be as shown in Table 6.

TABLE 6

| Extension to the Location Constraints Data Type | | | |
| --- | --- | --- | --- |
| Attribute name | Data type | Cardinality | Description |
| countryCode | String | 0 . . . 1 | The two-letter ISO 3166 country code in capital letters. Shall be present in case the "area" attribute is absent. May be absent if the "area" attribute is present |
| civicAddressElement | Array (Structure inlined) | 0 . . . N | Zero or more elements comprising the civic address. Shall be absent if the "area" attribute is present. |
| Area | Polygon | 0 . . . 1 | Geographic area. |
| cMECList | Structure (inlined) | 0 . . . N | List of cMEC identifiers and their location information. If a WTRU is requesting instantiation of an App in a certain cMEC, this structure may be present. |
| >cMECId | String | 1 | ID for the local cMECs available for the instantiation of the application |
| >cMECLocation | LocationInfo | 1 | Location of the cMEC, using the data types, for example as defined in MEC013 (Location Service API) |
| >accessPointID | String | 0 . . . N | The identity of the point of attachment of the cMEC to the local network, for example as specified in in MEC013 (Location Service API) or in some other form as an ApIdentity as in MEC028 (WLAN Information API) or 3GPP identifiers like the Ecgi and Nrcgi. |

According to embodiments, as a fourth operation 14-4, for example referring to FIG. 14, a WTRU 102 may create an application context, for example, to instantiate an application. For example, according to embodiments, in a case of completing the first through third operations discussed above, in order to instantiate an application, a WTRU 102 may create an application context through the use of POST ../app_contexts(AppContext). According to embodiments, a data type, or in other words, a data structure or structure, of a AppContext may include information (e.g., be modified) to indicate, for example, to the eMEC 200, that the application may be instantiated in the cMEC 1310. According to embodiments, the application may be instantiated according to (e.g., as provided, based on, etc.) the appLocation field (e.g., of type LocationConstraints) of the AppContext structure. According to embodiments, a LocationConstraints type may be modified (e.g., as noted above), for example, in order to be able to signal local cMEC locations. According to embodiments, a (e.g., modified, new, etc.) datatype, or in other words, a (e.g., extended, modified, new, etc.) structure of AppContext may be as shown in Table 7.

TABLE 7

| Extended AppContext Data Type | | | |
| --- | --- | --- | --- |
| Attribute name | Data type | Cardinality | Description |
| contextID | String | 0 . . . 1 | Uniquely identifies the application context in the MEC system. It is assigned by the MEC system and shall be present other than in the request |
| . . . | . . . | . . . | . . . |
| appSupportInstantiation | Boolean | 0 . . . 1 | Provides indication to the MEC system that application/s needs to be instantiated due to the support the auto instantiated application. |
| >appSupportList | Array (Structured Inline) | 1 . . . N | Provides list of application/s to the MEC system, that are dependent on the instantiated application |
| cMECRequired | Boolean | 0 . . . 1 | Provides indication if the Application requires of the use of a local cMEC, as provided by the appLocation structure. |

According to embodiments, (e.g., in a manner similar/ standard to/for ETSI procedures) after receiving an App-Context data type (e.g., AppContext information element, a/such primitive, etc.), a UALCMP 211 may authorize the request from the device application, and, in such case of authorization, may forward the request to an operations support system (OSS). According to embodiments, such authorization may take place (e.g., occur with/via/using/etc.) a MEC orchestrator, which may be referred to as a mobile edge orchestrator. According to embodiments, an OSS may (e.g., determine or make a decision on whether to) grant a context creation request. According to embodiments, a MEC orchestrator may trigger (e.g., command, instruct, orchestrate, start, etc.) the creation of the application context in any of the MEC system 200 or (e.g., local) CMEC 1310, for example, according to (e.g., depending on) the choices and preferences of the user.

registration of the local cMEC 1310 has a validity time. According to embodiments, as a fifth operation 14-5, for example referring to FIG. 14, before expiry of a validity timer of a registration, a WTRU 102 may update a registration lifetime. According to embodiments, for example, in order to update a registration, a WTRU 102 may call (e.g., use, receive, request, perform a call operation for etc.) a (e.g., newly defined) message ../local_cmec_ registration_update, the message including (information indicating) a cMECRegistrationUpdate structure, as shown in Table 8. According to embodiments, as a (e.g., different/ alternative) fifth operation 14-5, a WTRU 102 may call/ use ../local_cmec_registration, for example, by executing a "put" operation to update an existing resource) with a complete cMECRegistration structure, and for example, such "put" operation may consume a higher bandwidth.

TABLE 8

| cMECRegistrationUpdate Structure | | | |
|---|---|---|---|
| Attribute name | Data type | Cardinality | Description |
| cMECRegistrationUpdate | Structure (inlined) | 0 . . . N | List of MEC characteristics and connection options. |
| >cMECId | String | 1 | Identifier of the cMEC. This attribute may be globally unique. |
| >validityTime | Integer | 0 . . . 1 | Indicates how long the registration is valid. |
| >referenceURI | URI | 0 . . . 1 | Address of the cMEC instance. It may be included only in the response. |

According to embodiments, a UALCMP 211 may send (e.g., return, transmit, etc.) the 201 Created response to a WTRU 102, for example, for/to an application executed on the WTRU 102 (e.g., the device application). According to embodiments, the 201 Created response (e.g., a message body of the response) may include (e.g., information indicating) a data structure of the created application context, which may include, for example, address(es) (e.g., reference URIs) provided to clients that are external to the MEC system 200, for example, for interacting with the user application. According to embodiments, the 201 Created response may include, for example, as a message header, information indicating an address of a resource relating to an application instance context created and/or maintained by the MEC system 200.

According to embodiments, referring to (e.g., in a manner similar to) FIG. 14, a cMEC may be registered in/by/with the eMEC 200, for example, in a case (e.g., after) where the application is (e.g., already) instantiated. According to embodiments, in such a case, the eMEC 200 may provide (e.g., may send, will notify on) information indicating a change of (e.g., on the) available locations. According to embodiments, the eMEC 200 may provide such information via (e.g., using, through, etc.) an ApplicationLocationAvail-abilityNotification, which carries an appLocation field of the extended type LocationConstraints, for example, in order to inform of the new cMEC availability. According to embodiments, a WTRU 102 may request a context update, for example, to change an application location to a location associated with the new (e.g., local) cMEC 1310.

According to embodiments, there may be a (e.g., new, newly defined, etc.) message exchange for (e.g., enabling) updating a registration, for example, in a case where the According to embodiments, a UALCMP 211 may contact (e.g., relevant) entities of a MEC system 200, for example, in order to update a validity time of a registration. For example, according to embodiments, the UALCMP 211 may contact the relevant entities of the MEC system 200, via/ through a Mm9 interface, for example, according to (e.g., depending on) a type of MEC integration offered by the local cMEC 1310 and supported by the eMEC 200, in order to update the validity time of the registration. According to embodiments, a UALCMP 211 may send (e.g., return), to a WTRU 102, any of a 201 created response or a 200 OK, the response having a message body containing an updated cMECRegistration data structure. According to embodiments, the update cMECRegistration data structure may indicate (e.g., include information indicating) how the cMEC 1310 is registered at the eMEC system 200. According to embodiments, (e.g., optionally/additionally) an eMEC 200 may generate a new referenceURI that may be used to contact the updated cMEC instantiation at the eMEC 200.

According to embodiments, a WTRU 102 may de-register a (e.g., local) cMEC system 1310 from an eMEC 200. That is, as a sixth operation 14-6, for example referring to FIG. 14, a WTRU 102 may (e.g., determine to, decide to, be instructed to, etc.) stop using a (e.g., the local) cMEC system 1310, and (e.g., therefore) may choose to de-register it from the eMEC 200.

According to embodiments, the WTRU 102 may use a ../local_cmec_release, with the cMECRelease data type/ structure shown in Table 9, for example, to deregister the local cMEC 1310. According to embodiments, (e.g., as an alternative) a (e.g., local) cMEC 1310 may be de-registered by executing a "delete" operation on the original ../local_c-mec_registration resource, for example, as created in operation 2 discussed above.

TABLE 9 cMECRelease Data Type

| Attribute name | Data type | Cardinality | Description |
|---|---|---|---|
| cMECId | String | 1 | Identifier of the cMEC. This attribute may be globally unique. |

According to embodiments, for example, according to a type of MEC integration offered by a local cMEC 1310 and supported by an eMEC 200, a UALCMP 211 may contact relevant entities of a MEC system 200 through a Mm9 interface, for example, in order to cancel the registration of the (e.g., local) cMEC 1310. According to embodiments, a UALCMP 211 send (e.g., return) a 200 OK message to a WTRU 102.

Subscription and Notification for cMEC Information

Figure 15:
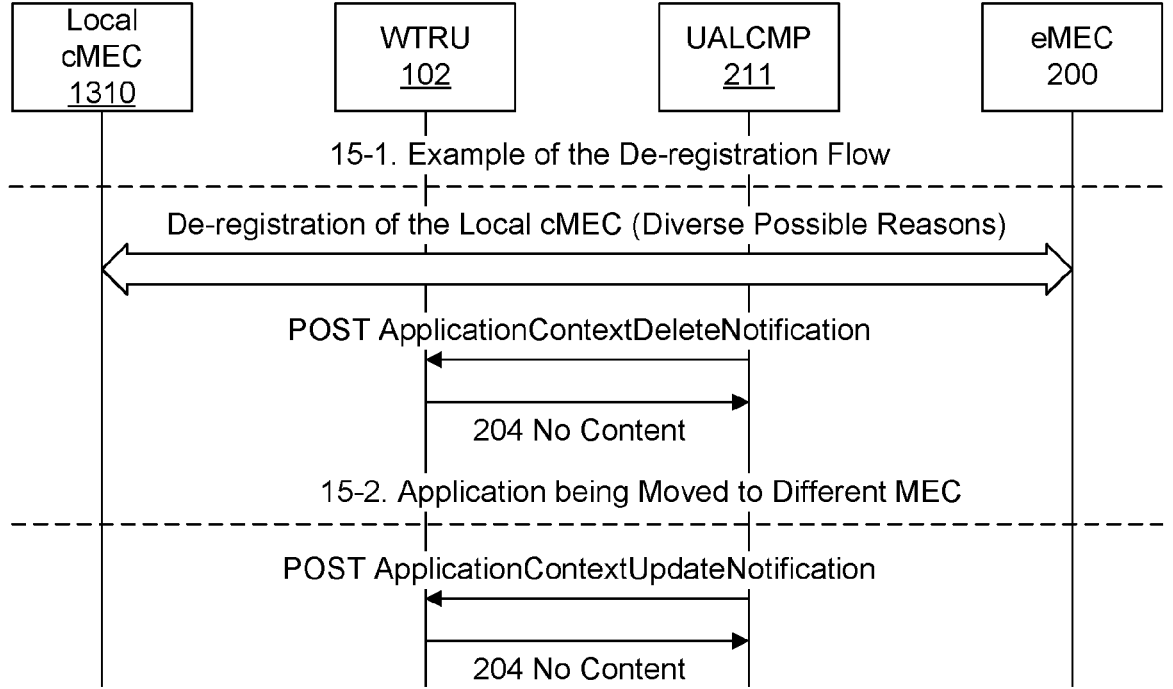
FIG. 15 is a diagram illustrating an application context update according to local cMEC de-registration, according to embodiments.

FIG. 15 is a diagram illustrating an application context update according to local cMEC de-registration, according to embodiments.

According to embodiments, for example, in a case where (e.g., after) a cMEC node is registered (as discussed above), a WTRU 102 may use (e.g., may be using) an MEC user application hosted by a local cMEC 1310. According to embodiments, such a WTRU 102 maybe another client device in the local area that did not execute the cMEC registration. In such a case, the local cMEC 1310 may be de-registered from the network, in a step 15-1, for example, due any of a variety of reasons, such as, for example, expiration of the registration validity time. According to embodiments, such de-registration (e.g., such an event) may trigger an ApplicationContextDeleteNotification, for example, via (e.g., using, through, standard) mechanisms of ETSI MEC. According to embodiments, such as ApplicationContextDeleteNotification may indicate (e.g., include information indicating), to WTRUs 102, that all the App-Contexts instantiated in the local cMEC 1310 have been removed, for example, as shown in FIG. 15. According to embodiments, there may be another case having (e.g., an occurrence of) movement of an MEC application (see 15-2), for example, from a local cMEC 1310 to the eMEC 200, or vice-versa, and between cMEC nodes, for any of several reasons, such as the de-registration of a local cMEC, for example, as shown in FIG. 15.

According to embodiments, the above two discussed notifications may (e.g., will suffice to) notify the WTRU 102 that is using the local cMEC 1310 with an active App Context. However, there may be a need for more than (e.g., merely) notifying other WTRUs 102 that may be starting the instantiation of an app in the local cMEC 1310 or planning to use it. According to embodiments, (e.g., in addition to the above message exchanges), there may be a (e.g., new) subscription family related to the cMEC presence. According to embodiments, for example, for such new subscription family, there may be (e.g., defined) any of a cMEC registration notification and a cMEC de-registration notification.

Figure 16:
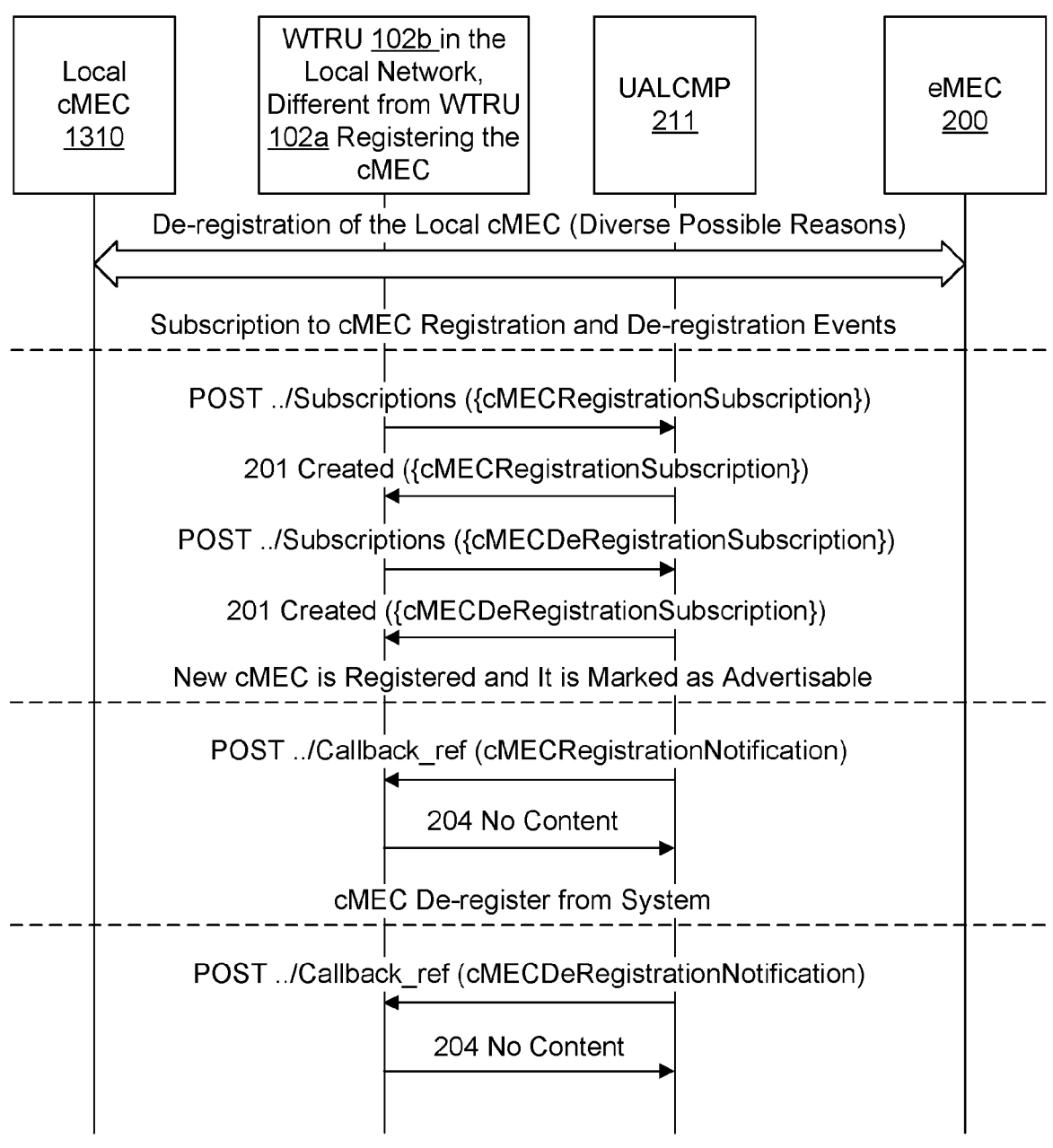
FIG. 16 is a diagram illustrating subscription and notification events, according to embodiments.

FIG. 16 is a diagram illustrating subscription and notification events, according to embodiments.

According to embodiments, a service consumer may create a subscription to events, for example, to receive notifications associated with such events, such as, for example, registration and/or de-registration events. According to embodiments, a subscription may be created according to (e.g., a mechanism for creating the subscription may be similar to) that as defined/described by ETSI MEC. According to embodiments, a service consumer may send a POST request having message body containing (e.g., information indicating) a {NotificationSubscription} data structure. According to embodiments, a variable {NotificationSubscription} may be replaced with the data type specified for the different event subscriptions, for example, as discussed/defined below. According to embodiments, the data type specified for the different event subscriptions may define (e.g., include information indicating) any of the subscribed event, the filtering criteria, and the address where the service consumer wishes to receive the event notifications. According to embodiments, a flow of messages for any of subscription and/or notification to/for events may be as shown in FIG. 16.

According to embodiments, below discussed data types (e.g., data structures, structures, information elements, messages, etc.) for NotificationSubscription may be associated with (e.g., used for) any of cMEC registration notifications and cMEC de-registration notifications.

Data Type: cMECRegistrationSubscription

According to embodiments, a cMECRegistrationSubscription data type, for example, as shown in Table 10, may represent a subscription for (e.g., receiving, getting, etc.) updates on a new cMEC made available in a geographical area of a WTRU (e.g., where the WTRU is present).

TABLE 10 cMECRegistrationSubscription Data Type

| Attribute name | Data type | Cardinality | Description |
|---|---|---|---|
| subscriptionType | String | 1 | May be set to "cMECRegistrationSubscription". |
| callbackReference | URI | 1 | URI selected by the service consumer to receive notifications on the subscribed cMEC registration. This shall be included both in the request and in response. |
| _links | Structure (inlined) | 0 . . . 1 | Hyperlink related to the resource. This shall be only included in the HTTP responses and in HTTP PUT requests. |
| >self | LinkType | 1 | Self-referring URI. The URI shall be unique as it acts as an ID for the subscription. |
| ueLocation | LocationInfo | 1 | Location of the WTRU, using the data types, for example as defined in MEC013 (Location Service API) |

TABLE 10-continued

| cMECRegistrationSubscription Data Type | | | |
|---|---|---|---|
| Attribute name | Data type | Cardinality | Description |
| accessPointID | String | 0 . . . N | List of identities for the APs the WTRU is connected to, for example as specified in MEC013 (Location Service API) |
| expiryDeadline | TimeStamp | 0 . . . 1 | The expiration time of the subscription. |

Data Type: cMECDeregistrationSubscription

According to embodiments, a cMECDeregistrationSub-scription data type, for example, as shown in Table 11, may represent a subscription for (e.g., receiving, getting, etc.) updates on the de-registration of cMECs.

TABLE 11

| cMECDeregistrationSubscription Data Type | | | |
|---|---|---|---|
| Attribute name | Data type | Cardinality | Description |
| subscriptionType | String | 1 | May be set to "cMECDeregistrationSubscription". |
| callbackReference | URI | 1 | URI selected by the service consumer to receive notifications on the subscribed cMEC registration. This shall be included both in the request and in response. |
| _links | Structure (inlined) | 0 . . . 1 | Hyperlink related to the resource. This shall be only included in the HTTP responses and in HTTP PUT requests. |
| >self | LinkType | 1 | Self-referring URI. The URI shall be unique as it acts as an ID for the subscription. |
| cMECId | String | 0 . . . N | List of IDs for the local cMECs from which a notification over de-registration needs to be generated |

According to embodiments, any of cMECRegistration-Subscription and cMECDeregistrationSubscription data types (e.g., messages) may be for subscribing (e.g., are used to subscribe) to certain notifications. According to embodiments, the below discussed data types (e.g., messages, information elements, etc.) are (e.g., new) notification types for conveying, for example, to the user, information asso-ciated with a new cMEC registration or cMEC de-registra-tion.

Data Type: cMECRegistrationNotification

According to embodiments, a cMECRegistrationNotifi-cation data type, for example, as shown in Table 12, may represent a notification for registration of a new cMEC in an area.

TABLE 12

| cMECRegistrationNotification Data Type | | | |
|---|---|---|---|
| Attribute name | Data type | Cardinality | Description |
| notificationType | String | 1 | May be set to "cMECRegistrationNotification". |
| timeStamp | TimeStamp | 0 . . . 1 | Time stamp. |
| cMECRegistration | Structure (inline) | 1 . . . N | List of MEC characteristics and connection options. |
| >location | LocationConstraints | 1 | Extended LocationConstraints data type indicating the location of the local cMEC, as defined in Table 6 |
| >cMECId | String | 1 | Identifier of the cMEC. This attribute may be globally unique. |
| >mx2IfaceURI | URI | 1 | URI of the Mx2 interface to access the local cMEC identified by cMECId. |
| >cMECfeat | CMECFeatures | 0 . . . 1 | Structure defining the features available in the cMEC Not required in the response. |
| >validiyTime | Integer | 0 . . . 1 | Indicates how long the registration is valid. |
| >referenceURI | URI | 0 . . . 1 | Address of the cMEC context instance. It may be included only in the response. |

Data Type: cMECDeregistrationNotification

According to embodiments, a cMECDeregistrationNotification data type, for example, as shown in Table 13, may represent a notification for a de-registration of a cMEC in an area.

TABLE 13

| cMECDeregistrationNotification Data Type | | | |
|---|---|---|---|
| Attribute name | Data type | Cardinality | Description |
| notificationType | String | 1 | May be set to "cMECDeregistrationNotification". |
| timeStamp | TimeStamp | 0 . . . 1 | Time stamp. |
| cMECID | String | 0 . . . N | List of IDs identifying the cMECs that have been de-registered. |

According to embodiments, referenced structures may be as discussed below. According to embodiments, an IntegrationInterface data type is shown in Table 14, and a CMECFeatures data type is shown in Table 15.

TABLE 14

| IntegrationInterface Data Type | | | |
|---|---|---|---|
| Attribute name | Data type | Cardinality | Description |
| type | Enum | 1 | Type of the integration interface provided. This is the URI used by the eMEC to connect to the cMEC. 0 - Or-Vi 1 - Mp3 2 - Mm5 3 - Mm3 4 - Mm1 |
| ifaceURI | URI | 1 | Address of the exposed interface. It must be provided according to the type. |
| auth | Structured (inline) | 1 | Authentication information to access the interface as provided by type and URI. |
| referenceURI | URI | 0 . . . 1 | Address of this interface context created at the system. Only used in responses |

TABLE 15

| CMECFeatures Data Type | | | |
|---|---|---|---|
| Attribute name | Data type | Cardinality | Description |
| memory | uint32 | 0 . . . 1 | Maximum total memory that can be used by the cMEC for hosting application instances in MB. |
| storage | uint32 | 0 . . . 1 | Maximum total storage that can be used by the cMEC for hosting application instances in MB. |
| latency | uint32 | 0 . . . 1 | Target round trip time in milliseconds supported for the communication between the cMEC system and the WTRU. |
| bandwidth | uint32 | 0 . . . 1 | Estimated bandwidth of the networking connecting the WTRU and the cMEC, in Mbps. |
| WANbandwidth | uint32 | 0 . . . 1 | Estimated bandwidth of the WAN connection between the cMEC and Internet, in Mbps. |
| hardwareType | Enum | 0 . . . 1 | Type of system architecture of the local cMEC: 0 - x86 1 - ARM 2 - Other |
| numberCPU | uint32 | 0 . . . 1 | Number of CPUs that a local cMEC can use to host user apps. |
| virtualizationType | Structure (inline) | 0 . . . 1 | Type of virtualization supported by the local cMEC: |
| >containerSupport | Enum | 0 . . . 1 | Declares the support (1) or lack of support (0) of container-based virtualization |
| >vmSupport | Enum | 0 . . . 1 | Declares the support (1) or lack of support (0) of hypervisor-based virtualization |
| >higherContSupport | Enum | 0 . . . 1 | Declares the support (1) or lack of support (0) of higher layer container-based virtualization |

TABLE 15-continued

| | | | CMECFeatures Data Type | | |
|---|---|---|---|
| Attribute name | Data type | Cardinality | Description |
| >nestingSupport | Enum | 0 . . . 1 | Declares the support (1) or lack of support (0) of the nesting of virtualization solutions |
| hwacceleration | Structure (inline) | 0 . . . 1 | Structure indicating the support of hardware acceleration |
| >supportFPGA | Enum | 0 . . . 1 | Indicates support (1) or lack of support (0) of FPGA-based acceleration |
| >supportGPU | Enum | 0 . . . 1 | Indicates support (1) or lack of support (0) of GPU-based acceleration |
| >supportAI | Enum | 0 . . . 1 | Indicates support (1) or lack of support (0) of Artificial Intelligence-based acceleration |
| >supportOther | Enum | 0 . . . 1 | Indicates support (1) or lack of support (0) of Other-based acceleration |
| servicecont | Enum | 0 . . . 1 | Required service continuity mode for this application. Permitted values: 0 = SERVICE_CONTINUITY_NOT_REQUIRED 1 = SERVICE_CONTINUITY_REQUIRED |
| volatility | Enum | 0 . . . 1 | This variable indicates the volatility of the cMEC with respect to the connectivity to the eMEC. 0 - The cMEC is not volatile. 1 - The cMEC is volatile |
| mecservicesavail | Structure (inline) | 0 . . . 1 | Services available at the local cMEC |
| >supportRNIS | Enum | 0 . . . 1 | Indicates support (1) or lack of support (0) of Radio Information Service |
| >supportWNIS | Enum | 0 . . . 1 | Indicates support (1) or lack of support (0) of Wireless Information Service |
| >supportLocation | Enum | 0 . . . 1 | Indicates support (1) or lack of support (0) of Location services |
| >supportIdentity | Enum | 0 . . . 1 | Indicates support (1) or lack of support (0) of Identity services |
| >supportTrafManag | Enum | 0 . . . 1 | Indicates support (1) or lack of support (0) of Traffic Management |
| >supportAppMob | Enum | 0 . . . 1 | Indicates support (1) or lack of support (0) of Application Mobility |
| >supportFixAcc | Enum | 0 . . . 1 | Indicates support (1) or lack of support (0) of Fixed Access Service |
| >supportV2XIS | Enum | 0 . . . 1 | Indicates support (1) or lack of support (0) of V2X Information Service |

FIG. 17 is a diagram illustrating an example of a method 1700, implemented by a WTRU 102.

According to embodiments, in a step 1710, the WTRU 102 may be configured to obtain information indicating at least one MEC resource available for integration by a MEC system 200, wherein the MEC system 200 supports a plurality of types of MEC resources available for integration, and wherein the at least one MEC resource is a subset of the plurality of types of MEC resources supported by the MEC system 200.

According to embodiments, in a step 1720, the WTRU 102 may be configured to transmit to the MEC system 200, information indicating at least one MEC resource, to be integrated by the MEC system 200, from the at least one MEC resource available for integration by the MEC system 200.

According to embodiments, in a step 1730, the WTRU 102 may be configured to receive, from the MEC system 200, information indicating an integration by the MEC system 200 of the at least one indicated MEC resource.

For example, the WTRU 102 may be configured such that it has the at least one MEC resource available for integration.

For example, a local network node 1310 may be configured such that it has the at least one MEC resource available for integration.

For example, the WTRU 102 may be further configured to receive information indicating a location of the at least one MEC resource available for integration, and or a location of the local network node 1310.

For example, the WTRU 102 may be further configured to configure the WTRU 102 to instantiate an application of the MEC system 200 in the at least one indicated MEC resource.

For example, the WTRU 102 may be further configured to transmit, to the local network node 1310 and/or to the MEC system 200, a request message indicating a request to instantiate an application of the MEC system 200 in the at least one indicated MEC resource, and/or wherein the request message indicates a location of the at least one indicated MEC resource.

For example, the types of MEC resources available for integration supported by the MEC system 200 may comprise any of a virtualization infrastructure manager associated with a network functions virtualization infrastructure, a MEP, a MEP associated with a MEPM, and a MEP associated with a MEPM and/or a MEC application orchestrator.

For example, the WTRU 102 may be further configured to: transmit, to the MEC system 200, a request message indicating a request for information indicating MEC applications available to instantiate on the MEC system 200; receive, from the MEC system 200, a response to the request message indicating the available MEC applications; and wherein the at least one indicated MEC resource is based on the available MEC applications received.

For example, the WTRU 102 may be further configured to: transmit, from the WTRU 102 to the MEC system 200, a message to update a characteristic of the at least one MEC resource integrated by the MEC system 200.

For example, the WTRU 102 may be further configured to: transmit, from the WTRU 102 to the MEC system 200, a message to request removal of the integration of the at least one MEC resource integrated by the MEC system 200.

For example, the message may include any of: an identifier attribute, a validity time attribute and a context attribute of the at least one MEC resource integrated by the MEC system 200.

For example, the at least one MEC resource available for integration may be a constrained MEC resource.

FIG. 18 is a diagram illustrating an example of a method 1800, implemented by a MEC system 200, wherein the MEC system 200 may support a plurality of types of MEC resources available for integration.

According to embodiments, in a step 1810, the MEC system 200 may be configured to receive from a WTRU 102, information indicating at least one MEC resource, to be integrated by the MEC system 200, from the at least one MEC resource available for integration by the MEC system 200, wherein the at least one MEC resource is a subset of the plurality of types of MEC resources supported by the MEC system 200.

According to embodiments, in a step 1820, the MEC system 200 may be configured to transmit to the WTRU 102, information indicating an integration by the MEC system 200 of the at least one indicated MEC resource.

For example, the WTRU 102 may be configured such that it has the at least one MEC resource available for integration.

For example, a local network node 1310 is configured such that it has the at least one MEC resource available for integration.

For example, the MEC system 200 may be further configured to: configure the WTRU 102 to instantiate an application of the MEC system 200 in the at least one indicated MEC resource.

For example, the MEC system 200 may be further configured to transmit, to the local network node 1310, a request message indicating a request to instantiate an application of the MEC system 200 in the at least one indicated MEC resource, and/or wherein the request message indicates a location of the at least one indicated MEC resource.

For example, the MEC system 200 may be further configured to receive, a request message indicating a request to instantiate an application of the MEC system 200 in the at least one indicated MEC resource, and/or wherein the request message indicates a location of the at least one indicated MEC resource.

For example, the types of MEC resources available for integration supported by the MEC system 200 comprise any of a virtualization infrastructure manager associated with a network functions virtualization infrastructure, a MEP, a MEP associated with a MEPM, and a MEP associated with a MEPM and/or a MEC application orchestrator.

For example, the MEC system 200 may be further configured to receive, to the WTRU 102, a request message indicating a request for information indicating MEC applications available to instantiate on the MEC system 200; and to transmit, from the WTRU 102, a response to the request message indicating the available MEC applications.

For example, the at least one indicated MEC resource is based on the available MEC applications received.

For example, the MEC system 200 may be further configured to receive, from the WTRU 102, a message to update a characteristic of the at least one MEC resource integrated by the MEC system 200.

For example, the MEC system 200 may be further configured to receive, from the WTRU 102, a message to request removal of the integration of the at least one MEC resource integrated by the MEC system 200.

For example, the message includes any of: an identifier attribute, a validity time attribute and/or a context attribute of the at least one MEC resource integrated by the MEC system 200.

For example, the at least one MEC resource available for integration is a constrained MEC resource.

FIG. 19 is a diagram illustrating an example of a method 1900, implemented by a WTRU 102 for any of registering and connecting a cMEC node (e.g., local network node 1310) included in an eMEC 200.

According to embodiments, in a step 1910, the WTRU 102 may be configured to, on condition that the WTRU 102 has discovered or located any of the cMEC node (e.g., local network node 1310) and a UALCMP 211 of the eMEC 200, transmit, to the UALCMP 211, a request for cMEC integration features associated with an eMEC 200.

According to embodiments, in a step 1920, the WTRU 102 may be configured to receive, from the UALCMP 211, a response to the request, the response including information indicating cMECIntegrationCapabilities for indicating integration options provided by the eMEC 200 and supported by the local cMEC.

For example, the WTRU 102 may be further configured to transmit, to the UALCMP 211, a message including information indicating a ../local_cmec_registration data structure via an Mx2 interface, the message being for registration with an eMEC 200 and including information used by the eMEC 200 to integrate the cMEC; and to receive, from the UALCMP 211, a return message in response to the message, through the Mm9 interface, as a 201 Created response, including a cMECRegistration data structure including information associated with registration and/or indicating how the cMEC is registered at the eMEC system 200.

For example, the WTRU 102 may be further configured to expose, a local cMEC 1310 that the WTRU 102 has access to on its local LAN, according to policies, such policies being associated with any of: application specific requirements; latency to the local cMEC; computing capabilities of the local cMEC; (e.g., network and storage) resource availability of the local cMEC; power status of the local cMEC; and hardware acceleration available at the local cMEC.

For example, any of the cMEC node (e.g., local network node 1310) and the UALCMP 211 of the eMEC 200 are any of are discovered or located over the Mx2 interface using authentication, and the request is any of: (1) carried over a Mx2 interface between a WTRU 102 and a UALCMP 211; and (2) including information indicating local cMEC integration options associated with the cMEC's integration features indicated as ../cmec_integration_options; and (3) including information indicating cMECIntegrationCapabilities for indicating integration options supported by the cMEC.

FIG. 20 is a diagram illustrating an example of a method 2000, implemented by a WTRU 102 for any of discovering a local cMEC, and instantiating a MEC user application for creating a context via query and asynchronous notification with an eMEC 200.

According to embodiments, in a step 2010, the WTRU 102 may be configured to, on condition that the WTRU 102 has received, from a UALCMP 211, an acknowledgement of the local cMEC 1310 successfully joining the eMEC 200, transmit, to the UALCMP 211, a request for a list of locations for instantiation of a MEC applications in a local area.

According to embodiments, in a step 2020, the WTRU 102 may be configured to receive, from the UALCMP 211, a response to the request, the response including information indicating application location availability, and being a 200 OK message having an ApplicationLocationAvailability data structure.

According to embodiments, in a step 2030, the WTRU 102 may be configured to transmit, to the UALCMP 211, a message for creating, by the WTRU 102, an application context, the message including information indicating a ../app_contexts data structure including information indicating, to the eMEC 200, that the application may be instantiated in the cMEC.

According to embodiments, in a step 2040, the WTRU 102 may be configured to receive, from the UALCMP 211, a response to the request, the response including information indicating cMECIntegrationCapabilities for indicating integration options provided by the eMEC 200 and supported by the local cMEC.

For example, the request may include information indicating any of: (1) an ApplicationLocationAvailability data structure included in an obtain_app_Ioc_availability Mx2 call; (2) locations in any of eMEC nodes 200 or cMEC nodes (e.g., local network node 1310) in a local area; and (3) a set of IDs for a cMEC indicated by extending the Location-Constraints structure, and wherein the application is instantiated according to the appLocation field, of type LocationConstraints, of the .../app_contexts data structure, wherein the LocationConstraints indicates local cMEC locations.

FIG. 21 is a diagram illustrating an example of a method 2100, implemented by a WTRU 102 for any of updating registration and de-registering of a cMEC with an eMEC 200.

According to embodiments, in a step 2110, the WTRU 102 may be configured to transmit, to a UALCMP 211, a message, for updating a registration of a local cMEC, as any of a ../local_cmec_registration_update message and a ../local_cmec_registration message of a complete cMECRegistration data structure.

According to embodiments, in a step 2120, the WTRU 102 may be configured to receive, from the UALCMP 211, a response to the message, the response being a 201 created message cMECRegistration.

According to embodiments, in a step 2130, the WTRU 102 may be configured to, on condition that the WTRU 102 determines to stop using the local cMEC, transmit, to the UALCMP 211, a deregistration message for deregistering the local cMEC 1310 from the eMEC 200.

According to embodiments, in a step 2140, the WTRU 102 may be configured to receive, from the UALCMP 211, a confirmation message a 200 OK response.

For example, the message is transmitted on condition of expiry of a timer associated with the local cMEC, and the deregistration message is any of a ../local_cmec_release message having a cMECRelease data structure, and a delete message associated with an original ../local_cmec_registration data structure.

While not explicitly described, the present embodiments may be employed in any combination or sub-combination. For example, the present principles are not limited to the described variants, and any arrangement of variants and embodiments can be used.

Besides, any characteristic, variant or embodiment described for a method is compatible with an apparatus device comprising means for processing the disclosed method, with a device comprising a processor configured to process the disclosed method, with a computer program product comprising program code instructions and with a non-transitory computer-readable storage medium storing program instructions.

CONCLUSION

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of infrared capable devices, i.e., infrared emitters and receivers. However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only, and is not intended to be limiting. As used herein, the term "video" or the term "imagery" may mean any of a snapshot, single image and/or multiple images displayed over a time basis. As another example, when referred to herein, the terms "user equipment" and its abbreviation "UE", the term "remote" and/or the terms "head mounted display" or its abbreviation "HMD" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU; (iii) a wireless-capable and/or wired-capable device configured with less than all structures and functionality of a WTRU; or (iv) the like. Details of an example WTRU, which may be representative of any WTRU recited herein, are provided herein with respect to FIGS. 1A-ID. As another example, various disclosed embodiments herein supra and infra are described as utilizing a head mounted display. Those skilled in the art will recognize that a device other than the head mounted display may be utilized and some or all of the disclosure and various disclosed embodiments can be modified accordingly without undue experimentation.

Examples of such other device may include a drone or other device configured to stream information for providing the adapted reality experience.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices that include processors are noted. These devices may include at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM)) or non-volatile (e.g., Read-Only Memory (ROM)) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples include one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components included within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may include usage of the introductory phrases "at least one" and "one or more" to introduce claim recitations. However, the use of such phrases should not be construed to imply that the introduction of a claim recitation by the indefinite articles "a" or "an" limits any particular claim including such introduced claim recitation to embodiments including only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero. And the term "multiple", as used herein, is intended to be synonymous with "a plurality".

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth. Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

What is claimed is:

1. A method implemented by a wireless transmit/receive unit (WTRU), the method comprising:

obtaining information indicating at least one first multi-access edge computing (MEC) resource available for integration by a MEC system, wherein the MEC system supports a plurality of types of MEC resources available for integration, and wherein a type of each of the at least one first MEC resource corresponds to at least one of the plurality of types of MEC resources;

transmitting, to the MEC system, information indicating at least one second MEC resource, to be integrated by the MEC system, from the at least one first MEC resource;

receiving, from the MEC system, information indicating an integration by the MEC system of the at least one second MEC resource; and transmitting, to the MEC system, a message for removal of the integration of the at least one second MEC resource from the MEC system, wherein the message for removal of the integration of the at least one second MEC resource from the MEC system includes an attribute that indicates removal of the at least one second MEC resource after expiration of a time period.

2. The method according to claim 1, wherein the WTRU is configured with the at least one first MEC resource.

3. The method according to claim 1, wherein a local network node is configured with the at least one first MEC resource.

4. The method according to claim 1, further comprising: receiving information indicating a location of the at least one first MEC resource.

5. The method according to claim 1, further comprising: configuring the WTRU to instantiate an application of the MEC system in the at least one second MEC resource.

6. The method according to claim 3, further comprising transmitting, to one or both of the local network node and the MEC system, a request message indicating a request to instantiate an application of the MEC system in the at least one second MEC resource, and wherein the request message indicates a location of the at least one second MEC resource.

7. The method according to claim 1, wherein the types of MEC resources comprise any of a virtualization infrastructure manager associated with a network functions virtualization infrastructure, a MEC platform (MEP), a MEP associated with a MEC platform manager (MEPM), and a MEP associated with at least one of a MEPM and a MEC application orchestrator.

8. The method according to claim 1, further comprising: transmitting, to the MEC system, a request message indicating a request for information indicating MEC applications available to instantiate on the MEC system; and receiving, from the MEC system, a response message to the request message, wherein the response message comprises information indicating one or more MEC applications.

9. The method according to claim 8, wherein the at least one second MEC resource is based on the one or more MEC applications.

10. The method according to claim 1, wherein the at least one first MEC resource is a constrained MEC resource.

11. The method according to claim 1, further comprising: transmitting, to the MEC system, a request for information regarding the least one type of MEC resource supported by the MEC system, prior to obtaining information regarding the at least one first MEC resource from the MEC system.

12. The method according to claim 1, further comprising: transmitting, to the MEC system, a message for updating a characteristic of the at least one second MEC resource integrated by the MEC system.

13. The method according to claim 1, wherein the at least one second MEC resource is determined based on one or more policies, and the one or more policies are based on any one of or combination of: 1) resources available for integration by the MEC system; 2) resources available in the WTRU; 3) capabilities of the MEC system; 4) capabilities of the WTRU; or 5) network conditions.

14. A wireless transmit/receive unit (WTRU), the WTRU comprising: circuitry, including a transmitter, a receiver and a processor, configured to configured to:

obtain information indicating at least one first multi-access edge computing (MEC) resource available for integration by a MEC system, wherein the MEC system supports a plurality of types of MEC resources available for integration, and wherein a type of each of the at least one first MEC resource corresponds to at least one of the plurality of types of MEC resources;

transmit, to the MEC system, information indicating at least one second MEC resource, to be integrated by the MEC system, from the at least one first MEC;

receive, from the MEC system, information indicating an integration by the MEC system of the at least one second MEC resource; and transmit, to the MEC system, a message for removal of the integration of the at least one second MEC resource from the MEC system, wherein the message for removal of the integration of the at least one second MEC resource from the MEC system includes an attribute that indicates removal of the at least one second MEC resource after expiration of a time period.

15. The WTRU according to claim 14, wherein the WTRU is configured with the at least one first MEC resource.

16. The WTRU according to claim 14, wherein a local network node is configured with the at least one first MEC resource.

17. The WTRU according to claim 14, wherein the circuitry is further configured to receive information indicating a location of the at least one first MEC resource.

18. The WTRU according to claim 14, wherein the circuitry is further configured to configure the WTRU to instantiate an application of the MEC system in the at least one second MEC resource.

19. The WTRU according to claim 16, wherein the circuitry is further configured to transmit, to one or both of the local network node and the MEC system, a request message indicating a request to instantiate an application of the MEC system in the at least one second MEC resource, and wherein the request message indicates a location of the at least one second MEC resource.

20. The WTRU according to claim 14, wherein the types of MEC resources comprise any of a virtualization infrastructure manager associated with a network functions virtualization infrastructure, a MEC platform (MEP), a MEP associated with a MEC platform manager (MEPM), and a MEP associated with at least one of a MEPM and a MEC application orchestrator.

21. The WTRU according to claim 14, wherein the circuitry is further configured to:

transmit, to the MEC system, a request message indicating a request for information indicating MEC applications available to instantiate on the MEC system; and receive, from the MEC system, a response message to the request message, wherein the response message comprises information indicating one or more MEC applications; and wherein the at least one second MEC resource is based on the one or more MEC applications.

22. The WTRU according to claim 14, wherein the at least one first MEC resource is a constrained MEC resource.

23. The WTRU according to claim 14, wherein the circuitry is further configured to transmit, to the MEC system, a request for information regarding the least one type of MEC resource supported by the MEC system, prior to obtaining information regarding the at least one first MEC resource from the MEC system.

24. The WTRU according to claim 14, wherein the circuitry is further configured to transmit, to the MEC system, a message for updating a characteristic of the at least one second MEC resource integrated by the MEC system.

25. The WTRU according to claim 14, wherein the WTRU is a constrained MEC device.

26. The WTRU according to 14, wherein the at least one second MEC resource is determined based on one or more policies, and the one or more policies are based on any one of or combination of: 1) resources available for integration by the MEC system; 2) resources available in the WTRU; 3) capabilities of the MEC system; 4) capabilities of the WTRU; or 5) network conditions.

\* \* \* \* \*